US009844778B2

(12) United States Patent
Shih et al.

(10) Patent No.: US 9,844,778 B2
(45) Date of Patent: Dec. 19, 2017

(54) TESTING MODULE AND METHOD FOR TESTING TEST SAMPLE

(71) Applicant: LITE-ON TECHNOLOGY CORPORATION, Taipei (TW)

(72) Inventors: Yi An Shih, Taipei (TW); Fu Chun Huang, Yonghe (TW); Cheng Chang Lai, Taipei (TW)

(73) Assignee: LITE-ON TECHNOLOGY CORPORATION, Taipei (TW)

( * ) Notice: Subject to any disclaimer, the term of this patent is extended or adjusted under 35 U.S.C. 154(b) by 202 days.

(21) Appl. No.: 14/535,610

(22) Filed: Nov. 7, 2014

(65) Prior Publication Data

US 2016/0033375 A1 Feb. 4, 2016

(30) Foreign Application Priority Data

Aug. 4, 2014 (TW) ............................ 103126547 A

(51) Int. Cl.

*G01N 24/00* (2006.01)
*B01L 3/00* (2006.01)

(52) U.S. Cl.

CPC ......... *B01L 3/502* (2013.01); *B01L 3/502715* (2013.01); *B01L 3/502738* (2013.01); *B01L 2200/027* (2013.01); *B01L 2200/04* (2013.01); *B01L 2200/0642* (2013.01); *B01L 2200/16* (2013.01); *B01L 2300/044* (2013.01); *B01L 2300/0672* (2013.01); *B01L 2300/0803* (2013.01); *B01L 2400/0409* (2013.01); *B01L 2400/0487* (2013.01)

(58) Field of Classification Search

None

See application file for complete search history.

(56) References Cited

U.S. PATENT DOCUMENTS

| | | | |
|---|---|---|---|
| 3,799,742 | A | 3/1974 | Coleman |
| 8,202,492 | B2 | 6/2012 | Linder et al. |
| 8,312,780 | B2 | 11/2012 | Blacklin et al. |
| 8,312,781 | B2 | 11/2012 | Himmelsbach et al. |

(Continued)

FOREIGN PATENT DOCUMENTS

| | | | |
|---|---|---|---|
| CN | 101720216 | A | 6/2010 |
| CN | 101754812 | A | 6/2010 |

(Continued)

OTHER PUBLICATIONS

EP Office Action dated Dec. 21, 2015 in European application (No. 14192065.2-1361).

(Continued)

*Primary Examiner* — Xiaoyun R Xu

(74) *Attorney, Agent, or Firm* — McClure, Qualey & Rodack, LLP

(57) ABSTRACT

A testing module is provided. The testing module includes a carrier, a block member, and a sampling assembly. A flow path connects a storage chamber to a mixing chamber to guide the flow of a fluid. The block member is formed in the flow path to block the fluid from flowing from the storage chamber to the mixing chamber before the connection of the sampling assembly. When the sampling assembly which contains a test sample is connected to the carrier, the fluid mixes with the test sample and flows to the mixing chamber.

20 Claims, 28 Drawing Sheets

(56) References Cited

U.S. PATENT DOCUMENTS

| | | | |
|---|---|---|---|
| 8,367,023 B2 | 2/2013 | Bae et al. | |
| 8,883,095 B2 | 11/2014 | Lai et al. | |
| 2006/0002827 A1 | 1/2006 | Curcio et al. | |
| 2012/0045375 A1 | 2/2012 | Miyamura et al. | |
| 2012/0141338 A1 | 6/2012 | Blacklin et al. | |
| 2012/0195796 A1 | 8/2012 | Watanabe | |
| 2012/0238033 A1 | 9/2012 | Linder et al. | |
| 2015/0182156 A1* | 7/2015 | Engbersen ....... | A61B 5/150022 435/7.94 |

FOREIGN PATENT DOCUMENTS

| | | | |
|---|---|---|---|
| CN | 102958613 | A | 3/2013 |
| CN | 103238052 | A | 8/2013 |
| CN | 103424356 | A | 12/2013 |
| EP | 2514528 | A1 | 10/2012 |
| GB | 2483077 | A | 2/2012 |
| JP | 2006038842 | A | 2/2006 |
| JP | 2009222709 | A | 10/2009 |
| JP | 2010526291 | A | 7/2010 |
| JP | 2013145217 | A | 7/2013 |
| TW | 201424842 | A | 7/2014 |
| WO | 2013162175 | A1 | 10/2013 |

OTHER PUBLICATIONS

JP Office Action dated Mar. 28, 2015 in Japanese application (No. 2015020225).

CN Office Action dated Sep. 1, 2016 in Chinese application (No. 201410624836.9).

TW Office Action dated Dec. 2, 2015 in Taiwan application (No. 103138669).

* cited by examiner

TESTING MODULE AND METHOD FOR TESTING TEST SAMPLE

CROSS REFERENCE TO RELATED APPLICATIONS

This application claims priority of Taiwan Patent Application No. 103126547, filed on Aug. 4, 2014, the entirety of which is incorporated by reference herein.

BACKGROUND

Field of the Invention

The present invention relates to a testing module and a method of using the testing module, and more particularly to a testing module with a designed flow path for changing the process to mix a test sample and a fluid and a method for using the testing module.

Description of the Related Art

The process for testing a test sample typically includes the following steps (1) providing a test sample; (2) providing a fluid to dilute the test sample; (3) fully mixing the test sample and a reactive reagent; and (4) performing a measurement. A conventional testing module for testing the test sample for example in2it, a product of Bio-rad, includes a mixing chamber. To carry out the above-mentioned steps, the fluid and the test sample are respectively introduced into the mixing chamber and are mixed in the mixing chamber. However, the process is quite time-consuming and not easy to operate.

In addition, in the process of collecting the test sample by a conventional sampling member, it is inevitable that excess test sample adheres the outer surface of the sampling member. When carrying out the measurement, the above excess test sample causes changes in the amount of the specimen, and a measurement error may occur.

Consequently, it would be desirable to provide a solution for the testing module to test the test sample.

SUMMARY

Accordingly, one objective of the present invention is to provide a testing module which is adapted to test a test sample. One advantage of the test module is that it can be quickly operated. A further advantage of the test module is that the amount of the test sample can be controlled to improve the measurement accuracy.

According to some embodiments of the disclosure, the testing module includes a flow path, a storage chamber, a carrier, a block member, and a sampling assembly. The flow path is used to guide the flow of a fluid. The storage chamber is fluidly connected to an upstream of the flow path and configured to provide the fluid. The carrier has a mixing chamber. The mixing chamber is fluidly connected to a downstream of the flow path and used to receive the fluid and the test sample. The block member is disposed in the flow path and selectively transformed from a first state to a second state. The sampling assembly is detachably connected to the carrier and includes a sampling member used to collect the test sample. Before the sampling assembly is connected to the carrier, the block member is in the first state to block the fluid in the storage chamber flowing from the upstream of the flow path to the downstream of the flow path. After the sampling assembly is connected to the carrier, the block member is in the second state to enable the fluid in the storage chamber to flow from the upstream of the flow path to the downstream of the flow path, wherein at least a portion of the fluid flows into the downstream of the flow path via the sampling member and mixes with the test sample in the sampling member.

In some embodiments, a passage is formed in the sampling member, and the test sample is disposed in the passage. The passage includes a fluid inlet, configured to receive the fluid in the storage chamber; and a fluid outlet, configured to exhaust the fluid and the test sample to the downstream of the flow path.

In some embodiments, the testing module further includes a puncturing structure arranged relative to the block structure. The block structure includes a membrane. A bottom opening is formed on a lower surface of the storage chamber, and the membrane is connected to the storage chamber relative to the bottom opening. The puncturing structure is configured to penetrate the membrane. The first state refers to the membrane being intact without breakage, and the second state refers to an opening being formed on the membrane after the sampling assembly is connected to the carrier.

In some embodiments, a top opening is formed on an upper surface of the storage chamber, and another membrane is formed on the upper surface of the storage chamber relative to the top opening, the puncturing structure penetrates both of the membranes after the sampling assembly is connected to the carrier.

In some embodiments, the puncturing structure includes a piercing part and a depressed portion depressed from a lateral surface of the puncturing structure for allowing the fluid from the storage chamber passing therethrough. In some embodiments, the puncturing structure includes a bottom portion and a top portion disposed on the bottom portion and having the piercing part. The lateral surface relative to the top portion has an inclined surface, and the width of the top portion is varied. In some embodiments, the testing module further includes a supporting member disposed adjacent to the puncturing structure, and after the sampling assembly is connected to the carrier, the storage chamber abuts against the supporting member.

In some embodiments, the storage chamber includes a number of storage spaces secluded from each other. The number of the storage spaces corresponds to that of the puncturing structures, and each puncturing structure faces one of the storage spaces. In some embodiments, the puncturing structure and the sampling assembly are formed integrally and connected to the carrier in a detachable manner.

In some embodiments, at least one dent is formed on a circumferential surface of the sampling member and communicates with the passage, and the fluid inlet is formed relative to the at least one dent, and the fluid outlet is formed on a bottom surface of the sampling member. In some embodiments, the passage comprises another fluid inlet configured to receive the fluid in the storage chamber, and the number of the at least one dent is two, wherein the two dents are formed on two opposite sides of the circumferential surface of the sampling member, the two fluid inlets are respectively formed relative to the two dents.

In some embodiments, the carrier further comprises an accommodating space and a through hole fluidly connecting the mixing chamber and the accommodating space, wherein the storage chamber is placed in the accommodating space and the sampling assembly is disposed in the through hole when the sampling assembly is connected to the carrier.

In some embodiments, the block structure comprises a recess formed on an upper surface of the carrier, and when the sampling assembly is connected to the carrier, the sampling member is disposed in the recess, wherein a width of the sampling member is smaller than that of the block structure.

In some embodiments, the block structure comprises an opening penetrating the carrier, and a notch is formed in the vicinity of the block structure, wherein the sampling assembly further comprises a clamping structure, after the sampling assembly is connected to the carrier, the clamping structure engages with the notch, and the sampling assembly is disposed in the opening. In some embodiments, the testing module further includes a liquid-absorbing material disposed on a lower surface of the carrier relative to the opening.

In some embodiments, the sampling assembly comprises a supporting structure, wherein the sampling member is disposed on the supporting structure. The block structure includes a recess, formed on an upper surface of the carrier and including a bottom surface; and an opening, formed on a lower surface of the carrier and communicating with the recess. The sampling assembly is connected to the carrier through the opening, and the supporting structure abuts the bottom surface of the recess when the sampling member is placed in the flow path. In some embodiments, the bottom surface of the recess is an inclined surface. A region of the bottom surface of the recess which is adjacent to the upstream of the flow path is higher than another region of the bottom surface of the recess which is adjacent to the downstream of the flow path.

Another objective of the disclosure is to provide a method for testing a test sample. According to some embodiments of the disclosure, the method includes blocking a fluid from a storage chamber flowing into a mixing chamber via a flow path; collecting the test sample by a sampling assembly; placing the sampling assembly in the flow path; enabling the fluid to flow out of the storage chamber and to pass through the sampling assembly to mix with the test sample collected by the sampling assembly; and enabling the fluid mixed with the test sample to flow into the mixing chamber.

In some embodiments, the operation of driving the fluid to flow out of the storage chamber includes providing a centrifugal force or a pump so as to actuate the flow of the fluid.

In some embodiments, the fluid comprises a diluent or a reactive reagent, and the test sample comprises blood, urine, sputum, semen, feces, pus, tissue fluid, bone marrow, cell sample, or any other bodily fluid, and the mixing chamber is formed in a carrier.

In some embodiments, the operation of blocking the fluid from the storage chamber flowing into the mixing chamber via the flow path comprises providing a block structure to block the storage chamber, forming an opening at the flow path, or forming a recess on the flow path.

BRIEF DESCRIPTION OF THE DRAWINGS

For a more complete understanding of the embodiments, and the advantages thereof, reference is now made to the following descriptions taken in conjunction with the accompanying drawings.

DESCRIPTION OF THE ILLUSTRATIVE EMBODIMENTS

The following description is of the best-contemplated mode of carrying out the invention. This description is made for the purpose of illustrating the general principles of the invention and should not be taken in a limiting sense. The scope of the invention is best determined by reference to the appended claims.

Figure 1:
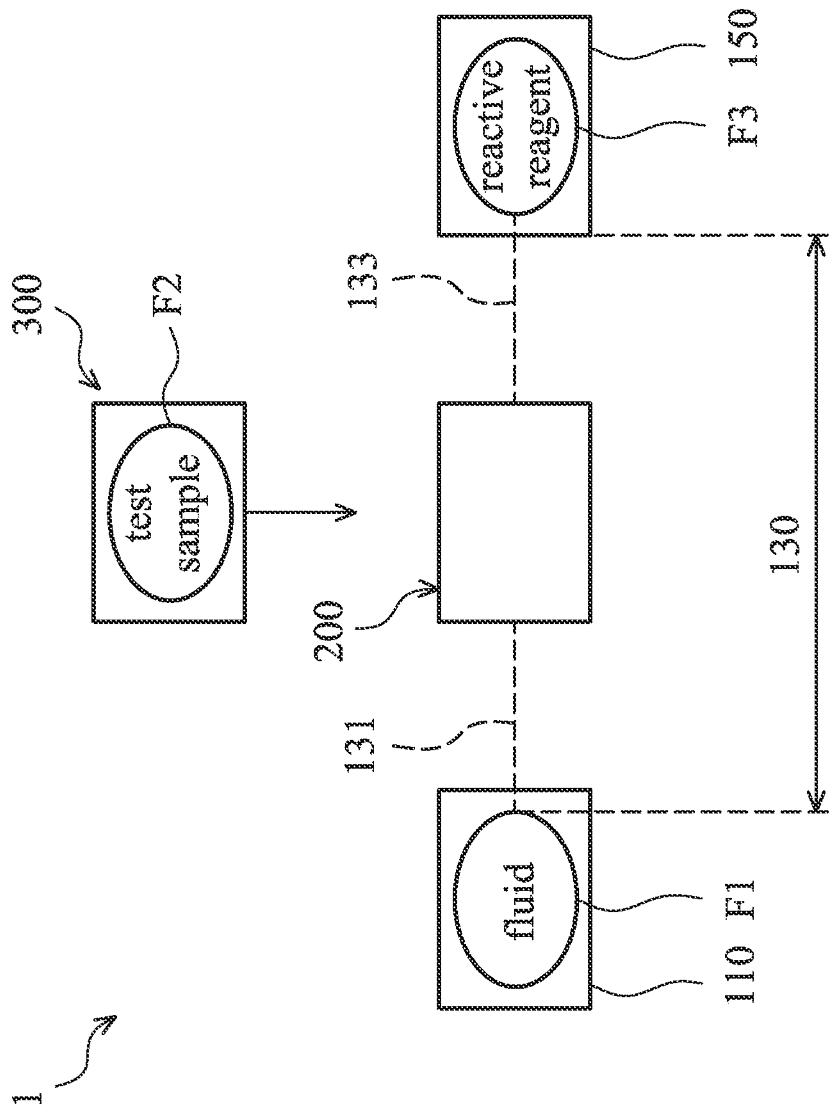
FIG. 1 shows a block diagram of a testing module of the disclosure.

FIG. 1 shows a block diagram of a testing module 1 of the disclosure. According to the disclosure, the testing module 1 which is adapted to test a test sample F2 includes a storage chamber 110, a mixing chamber 150, a flow path 130, a block structure 200, and a sampling assembly 300. The storage chamber 110 is fluidly connected to the mixing chamber 150 via the flow path 130. In one embodiment, the storage chamber 110 holds a fluid F1, and the mixing chamber 150 holds a reactive reagent F3. The block structure 200 is disposed in the flow path 130 and configured to block the fluid F1 of the storage chamber 110 from flowing into the mixing chamber 150 before the placing of the sampling assembly 300 into the flow path 130. The sampling assembly 300 is configured to collect the test sample F2 for test. After the placing of the sampling assembly 300 in the flow path 130 corresponding to the block structure 200, the fluid F1 in an upstream 131 of the flow path 130 flows to a downstream 133 of the flow path 130 via the sampling assembly 300. In addition, due to the earlier mixing of the fluid F1 and the test sample F2 before flowing into the mixing chamber 150, the process for testing the test sample F2 is simplified.

First Embodiment

Figure 2:
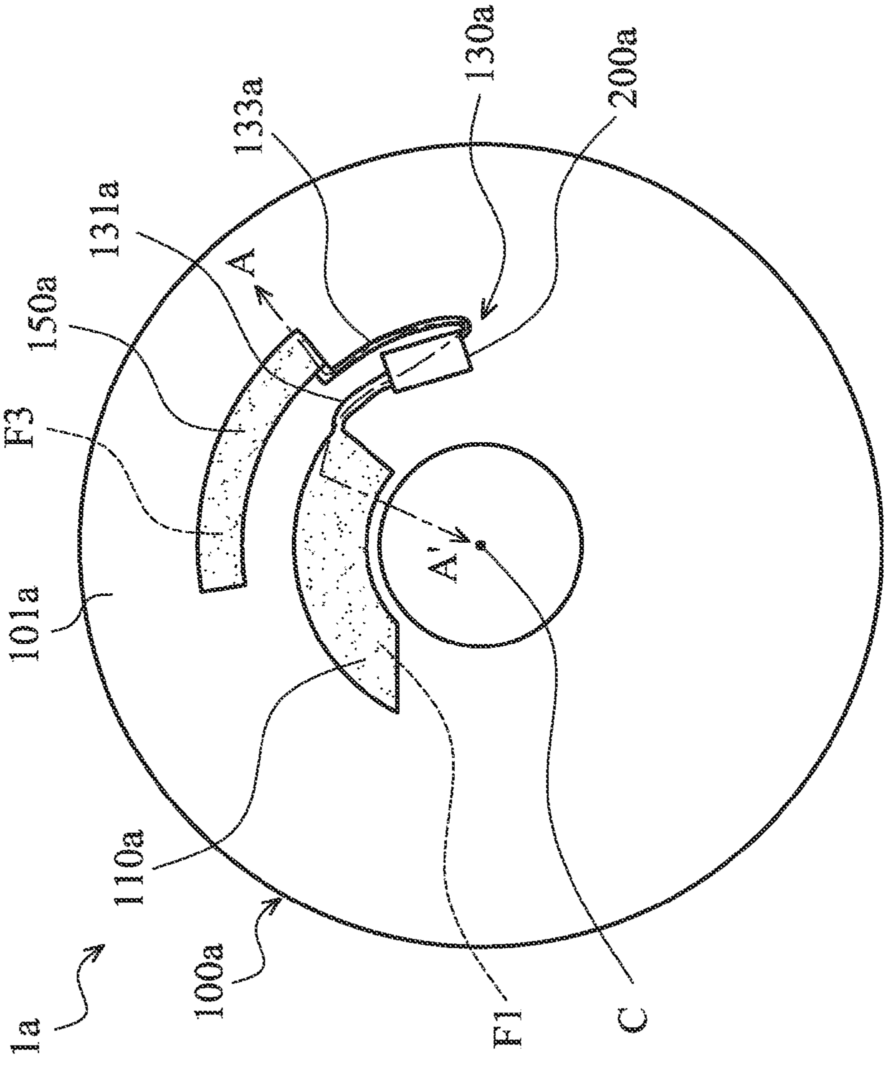
FIG. 2 shows a top view of the testing module of a first embodiment of the disclosure.

FIG. 2 shows a top view of the testing module 1*a* of the first embodiment of the disclosure. According to the first embodiment of the disclosure, the testing assembly 1*a* includes a carrier 100*a* and a block structure 200*a*. In the first embodiment, a storage chamber 110*a*, a flow path 130*a*, and a mixing chamber 150*a* are respectively formed on an upper surface 101*a* of the carrier 100*a*. The storage chamber 110*a* and the mixing chamber 150*a* are separated from each other and fluidly connected to each other via the flow path 130*a*. In this embodiment, the position of the storage chamber 110*a* is closer to a substantial center C of the carrier 100*a* than that of the mixing chamber 150*a*. The storage chamber 110*a* may be used to hold a fluid F1, such as salt water or another diluent. The mixing chamber 150*a* may be used to hold a reactive reagent F3, such as reactive material. The block structure 200*a* is a recess formed on the upper surface 101*a* of the carrier 100*a* and disposed between an upstream 131*a* and a downstream 133*a* of the flow path 130*a*.

Figure 3A:
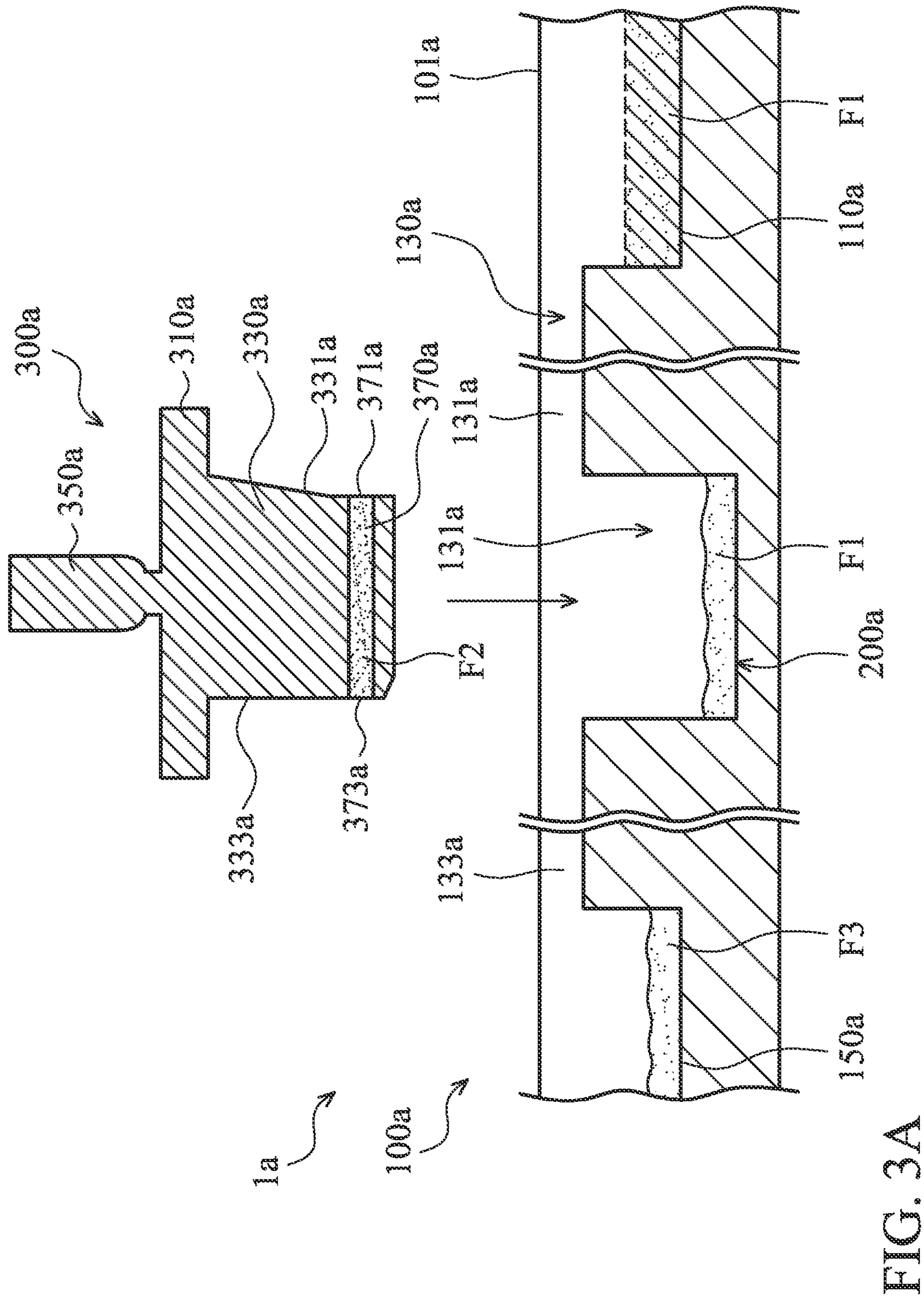
FIG. 3A shows a schematic cross-sectional view of the testing module of the first embodiment of the disclosure taken along line A-A' of FIG. 2 with a block structure in a first state.

FIG. 3A shows a schematic cross-sectional view of the testing module 1*a* of the first embodiment of the disclosure taken along line A-A' of FIG. 2. According to the first embodiment of the disclosure, the testing module 1*a* further includes a sampling assembly 300*a*. In this embodiment, the sampling assembly 300*a* includes a seat 310*a*, a sampling member 330*a* and a handle 350*a*. The sampling member 330*a* and the handle 350*a* are respectively disposed on two opposite sides of the seat 310*a*. The handle 350*a* is configured to facilitate the holding of a manipulator or a robotic arm. A passage 370*a* is formed in the sampling member 330*a*, wherein a fluid inlet 371*a* and a fluid outlet 373*a* located at two ends of the passage 370*a* are respectively formed on two opposite lateral surfaces 331*a* and 333*a* of the sampling member 330*a*. The passage 370*a* is adapted to collect the test sample F2 such as blood, urine, sputum, semen, feces, pus, tissue fluid, bone marrow, cell test sample, or any other bodily fluid.

The operation method of testing the test sample F2 by the testing module 1*a* according to the first embodiment of the disclosure is described below.

In the beginning, as shown in FIG. 3A, the fluid F1 is provided in the storage chamber 110*a*, and the reactive reagent F3 is provided in the mixing chamber 150*a*. Before the combination of the sampling assembly 300*a* and the carrier 100*a*, the block structure 200*a* is in a first state, in which the block structure 200*a* is not closed. The fluid F1 may flow out of the storage chamber 110*a* due to a swinging motion of the carrier 100*a*. However, because the block structure 200*a* is in the first state, the fluid F1 is held in the block structure 200*a* and is limited not to flow into the mixing chamber 150*a* via the flow path 130*a*. Therefore, the reactive reagent F3 is prevented from being contaminated by the fluid F1.

Afterwards, as shown in FIG. 3A, the test sample F2 is collected in the passage 370*a* by the sampling assembly 300*a* and kept in the passage 370*a* via capillary force.

Afterwards, the sampling assembly 300*a* is transported and combined to the carrier 100*a*, wherein the sampling assembly 300*a* is placed in the flow path 130*a* corresponding to the block structure 200*a*. At this moment, the block structure 200*a* is in a second state, in which the block structure 200*a* is closed by the seat 310*a*. The sampling assembly 300*a* and the carrier 100*a* are combined through means including gluing and clamping. The sampling assembly 300*a* and the carrier 100*a*, shown in FIG. 3B, are connected by gluing.

Figure 3B:
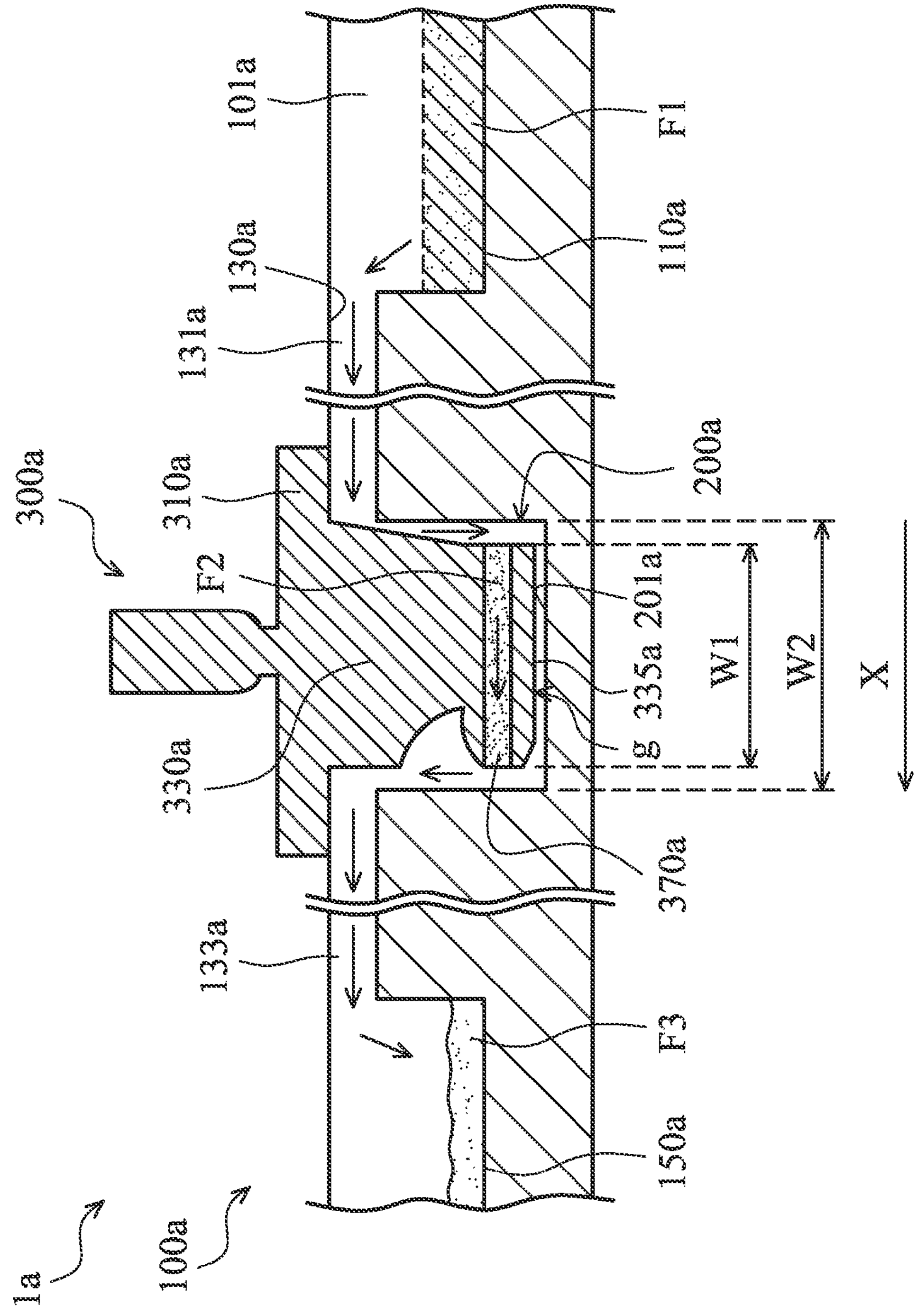
FIG. 3B shows a schematic cross-sectional view of the testing module of the first embodiment of the disclosure taken along line A-A' of FIG. 2 with the block structure in a second state.

Afterwards, as shown in FIG. 3B, after the connection of the sampling assembly 300*a* and the carrier 100*a*, the seat 310*a* of the sampling assembly 300*a* is supported by the upper surface 101*a* of the carrier 100*a*, and the sampling member 330*a* of the sampling assembly 300*a* is placed in the block structure 200*a*. It should be noted that along substantially an extension direction X of the flow path 130*a*, the width W1 of the sampling member 330*a* is smaller than the width W2 of the block structure 200*a*. In addition, a gap g is formed between a lower surface 335*a* of the sampling member 330*a* and a bottom surface 201*a* of the block structure 200*a* to allow the fluid F1 to pass therethrough.

Afterwards, the fluid F1 is driven to flow from the storage chamber 110*a* to the sampling assembly 300*a*, and the fluid F1 is mixed with the test sample F2 collected by the sampling assembly 300*a*. Specifically, the fluid F1 is driven to flow out of the storage chamber 110*a* by applying an external force and to flow to the block structure 200*a* via the upstream 131*a*. After the fluid F1 flows into the block structure 200*a*, a portion of the fluid F1 flows to the downstream 133*a* via the gap g between the sampling member 330*a* and the block structure 200*a*, and the other portion of the fluid F1 flows to the downstream 133*a* via the passage 370*a* and mixes with the test sample F2 in the passage 370*a*. Generally, the viscosity of the fluid F1 is lower than that of the test sample F2 so as to facilitate the fluid F1 flushing the test sample F2 out of the passage 370*a*; however, the embodiment should not be limited thereto. The viscosity of the fluid F1 may be higher than or equal to that of the test sample F2 and the fluid F1 will enter the passage 370*a* and bring the test sample F2 to the mixing chamber 150*a*.

Afterwards, the fluid F1 is driven to flow into the mixing chamber 150*a* via the downstream 133*a*. At this moment, since the fluid F1 has been already mixed with the test sample F2 before flowing into the mixing chamber 150*a*, the test sample F2 immediately reacts with the reactive reagent F3 once that the fluid F1 flows into the mixing chamber 150*a*. Last, after the reaction of the test sample F2 and the reactive reagent F3 is finished, a measurement of the reaction result is performed. The process of testing the test sample F2 is completed.

In the first embodiment, the operation of driving the fluid F1 to flow out of the storage chamber 110*a* includes rotating the carrier 100*a* about the substantial center C of the carrier 100*a* to generate a centrifugal force to drive the fluid F1 to flow. In another embodiment, the operation of driving the fluid F1 to flow out of the storage chamber 110*a* includes providing a pump to drive the fluid F1 to flow.

Second Embodiment

Figure 4A:
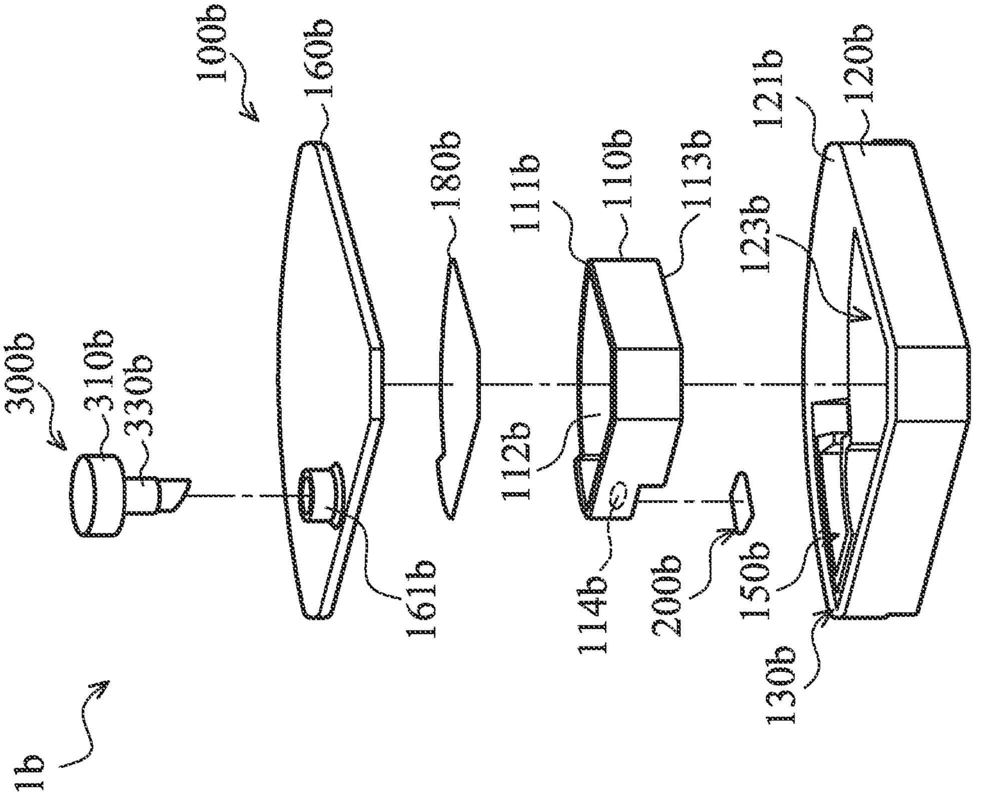
FIG. 4A shows an exploded view of the testing module of a second embodiment of the disclosure.
Figure 4B:
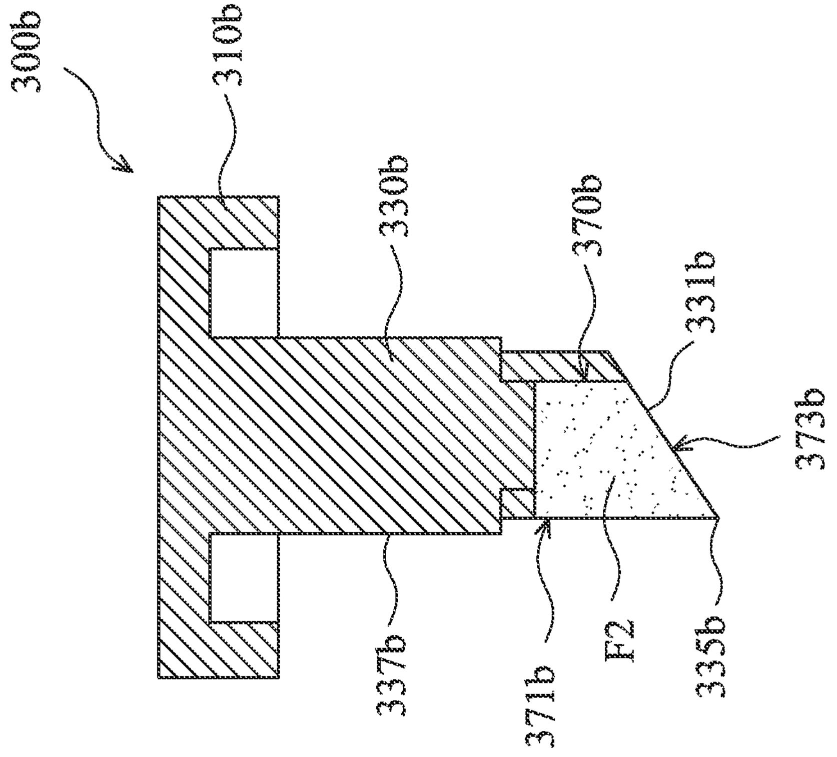
FIG. 4B shows a schematic cross-sectional view of a sampling assembly of a second embodiment of the disclosure.
Figure 4C:
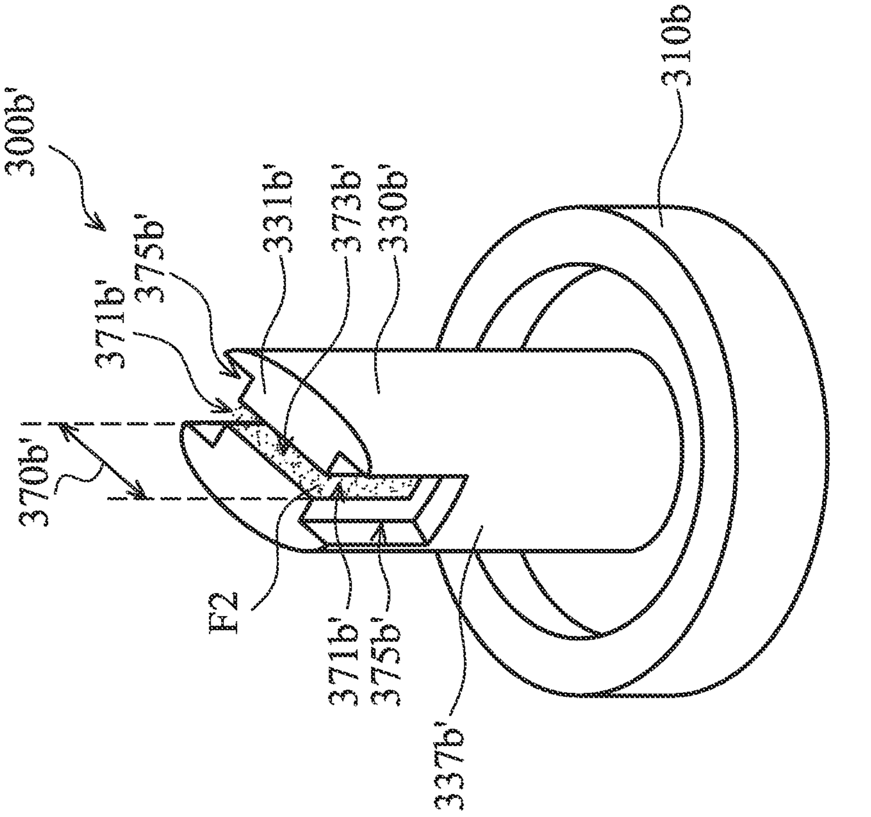
FIG. 4C shows a schematic view of a sampling assembly of the other embodiment of the disclosure.

FIG. 4A shows an exploded structural view of the testing module 1*b* of a second embodiment of the disclosure FIG. 4B shows a schematic cross-sectional view of a sampling assembly 300*b* of a second embodiment of the disclosure. FIG. 4C shows a schematic view of a sampling assembly 300*b*' of the other embodiment of the disclosure. In the second embodiment, the testing assembly 1*b* includes a carrier 100*b* and a block structure 200*b*, and a sampling assembly 300*b*.

The carrier 100*b* includes a base 120*b*, an accommodating space 123*b*, a storage chamber 110*b*, a mixing chamber 150*b*, and a cover 160*b*. The accommodating space 123*b* is formed at an upper surface 121*b* of the base 120*b*. The accommodating space 123*b* has a shape which conforms to the shape of the storage chamber 110*b* such that the storage chamber 110*b* can be placed in the accommodating space 123*b*. The mixing chamber 150 *b* is formed on the upper surface 121*b* of the base 120*b* and arranged adjacent to the accommodating space 123*b*. The accommodating space 123*b* communicates with the mixing chamber 150*b* via a flow path 130*b*.

The storage chamber 110*b* is a hollow case, a top opening 112*b* is formed on an upper surface 111*b* of the storage chamber 110*b*. A membrane 180*b* is placed on the upper surface 111*b* relative to the top opening 112*b*. The membrane 180*b* may be a metallic membrane (such as an aluminum membrane) or a plastic membrane and may be connected to the edge of the upper surface 111*b* of the storage chamber 110*b* by ultrasonic fusing, heat sealing, or laser radiation. A bottom opening 114*b* is formed on a lower surface 113*b* of the storage chamber 110*b*. The block structure 200*b* is placed on the lower surface 113*b* of the storage chamber 110*b* relative to the bottom opening 114*b*. In the second embodiment, the block structure 200*b* is a membrane, such as an aluminum membrane. The block structure 200*b* may be placed on the lower surface 113*b* of the storage chamber 110*b* by ultrasonic fusing, heat sealing, or laser radiation.

The cover 160*b* is disposed on the base 120*b*, so as to fix the storage chamber 110*b* in the base 120*b*. A guiding hole 161*b* is formed on the cover 160*b* relative to the top opening 112*b* to facilitate the passing of the sampling assembly 300*b*.

As shown in FIG. 4B, the sampling assembly 300*b* includes a seat 310*b* and a sampling member 330*b* connected to the seat 310*b*. The sampling member 330*b* has a bottom surface 331*b* with a puncturing structure 335*b*. A passage 370*b* is formed in the sampling member 330*b*, wherein a fluid inlet 371*b* of the passage 370*b* is formed at the circumferential surface 337*b* of the sampling member 330*b*, and a fluid outlet 373*b* of the passage 370*b* is formed at the bottom surface 331*b* of the sampling member 330*b*. The passage 370*b* is used to collect the test sample F2 such as blood, urine, sputum, semen, feces, pus, tissue fluid, bone marrow, cell sample, or any other bodily fluid through capillary force. However, the structural feature of the sampling assembly 300*b* should not be limited to the above embodiment.

As shown in FIG. 4C, in the other embodiment, the sampling assembly 300*b*' includes a seat 310*b*, and a sampling member 330*b*' connected to the seat 310*b*. The sampling member 330*b*' has a columnar structure with a bottom surface 331*b*'. Two dents 375*b*' are formed on a circumferential surface 337*b*' and located on two opposite sides of the sampling member 330*b*'. A passage 370*b*' is connected between and communicates with the two dents 375*b*'. The passage 370*b*' has two fluid inlets 371*b*' formed relative to the dents 375*b*', and the passage 370*b*' has a fluid outlet 373*b*' formed on the bottom surface 331*b*' of the sampling member 330*b*'. The passage 370*b*' is used to collect the test sample F2 such as blood, urine, sputum, semen, feces, pus, tissue fluid, bone marrow, cell sample, or any other bodily fluid through capillary force. Since the two fluid inlets 371*b*' are respectively formed in the dents 375*b*', the test sample F2 is kept within the passage 370*b*' and kept from being in contact with other elements and from being released during an insertion process of the sampling assembly 300*b*' into the storage chamber 110*b*. In some other embodiments, the number of the dent 375*b*' may be one. and the passage 370*b*' has one fluid inlet 371*b*' formed relative to the dents 375*b*, and the passage 370*b*' has a fluid outlet 373*b*' formed on the bottom surface 331*b*' of the sampling member 330*b*'.

Figure 5:
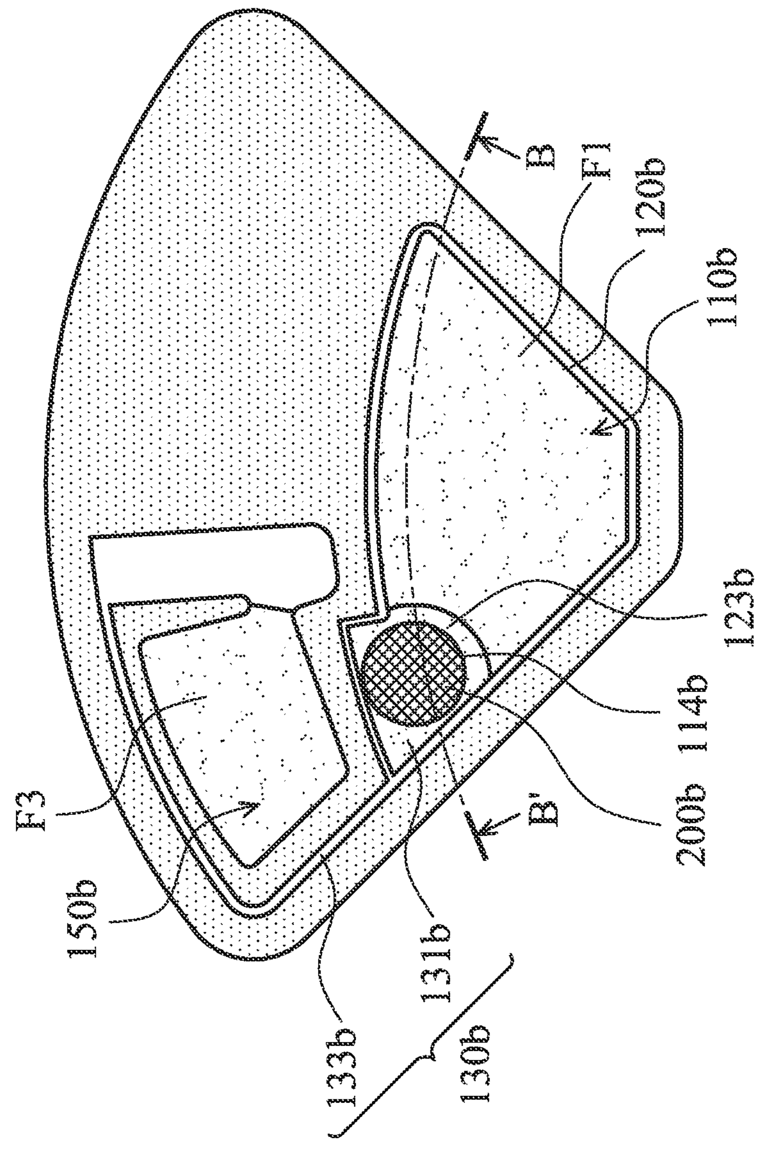
FIG. 5 shows a top view of a portion of the testing module of the second embodiment of the disclosure.
Figure 6A:
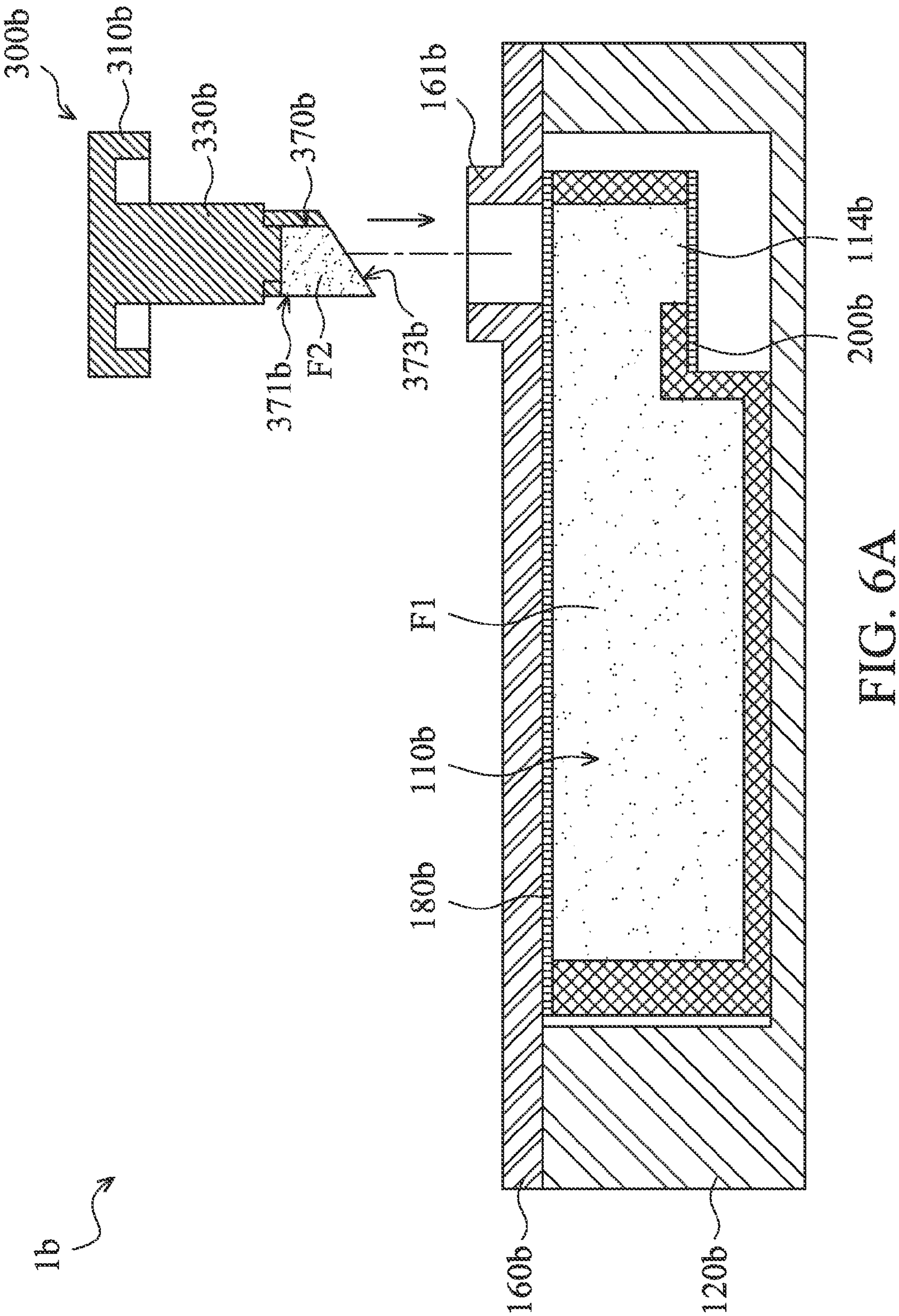
FIG. 6A shows a schematic cross-sectional view of the testing module of the second embodiment of the disclosure with a block structure in a first state.

FIG. 5 shows a top view of a portion of the structure of the testing module 1*b* of the second embodiment of the disclosure. In the second embodiment, a flow path 130*b* is formed in the testing assembly 1*b*. Specifically, an upstream 131*b* of the flow path 130*b* is formed in the storage chamber 110*b*, and a downstream 133*b* of the flow path 130*b* is formed in the base 120*b*. In addition, the storage chamber 110*b* is fluidly connected to the upstream 131*b*, and the mixing chamber 150*b* is fluidly connected to the downstream 133*b*. The storage chamber 110*b* may be used to hold a fluid F1, such as salt water or another diluent. The mixing chamber 150*b* may be used to hold a reactive reagent F3, such as reactive material. Referring to FIGS. 5 and 6A, FIG. 6A shows a schematic cross-sectional view of the testing module 1*b* of the second embodiment of the disclosure taken along line B-B' of FIG. 5. The operation method of testing the test sample F2 by the testing module 1*b* according to the second embodiment of the disclosure is described below.

In the beginning, as shown in FIG. 5, the fluid F1 is provided in the storage chamber 110*b*, and the reactive reagent F3 is provided in the mixing chamber 150*b*. As shown in FIG. 6A, before the connection of the sampling assembly 300*b* and the carrier 100*b*, the block structure 200*b* is in a first state, in which the membrane (the block structure 200*b*) is intact without breakage. Therefore, the storage chamber 110*b* is sealed by the membrane 180*b* and the block structure 200*b*, and the fluid F1 is safely held in the storage chamber 110*b*.

Afterwards, as shown in FIG. 6A, the test sample F2 is collected in the passage 370*b* by the sampling assembly 300*b* and kept in the passage 370*b* through capillary force.

Afterwards, the sampling assembly 300*b* is transported and connected to the carrier 100*b*, wherein the sampling assembly 300*b* is inserted into the sampling assembly 100*b* and guided by the guiding hole 161*b* of the cover 160*b*, and therefore the sampling assembly 300*b* is engaged on the cover 160*b*.

Figure 6B:
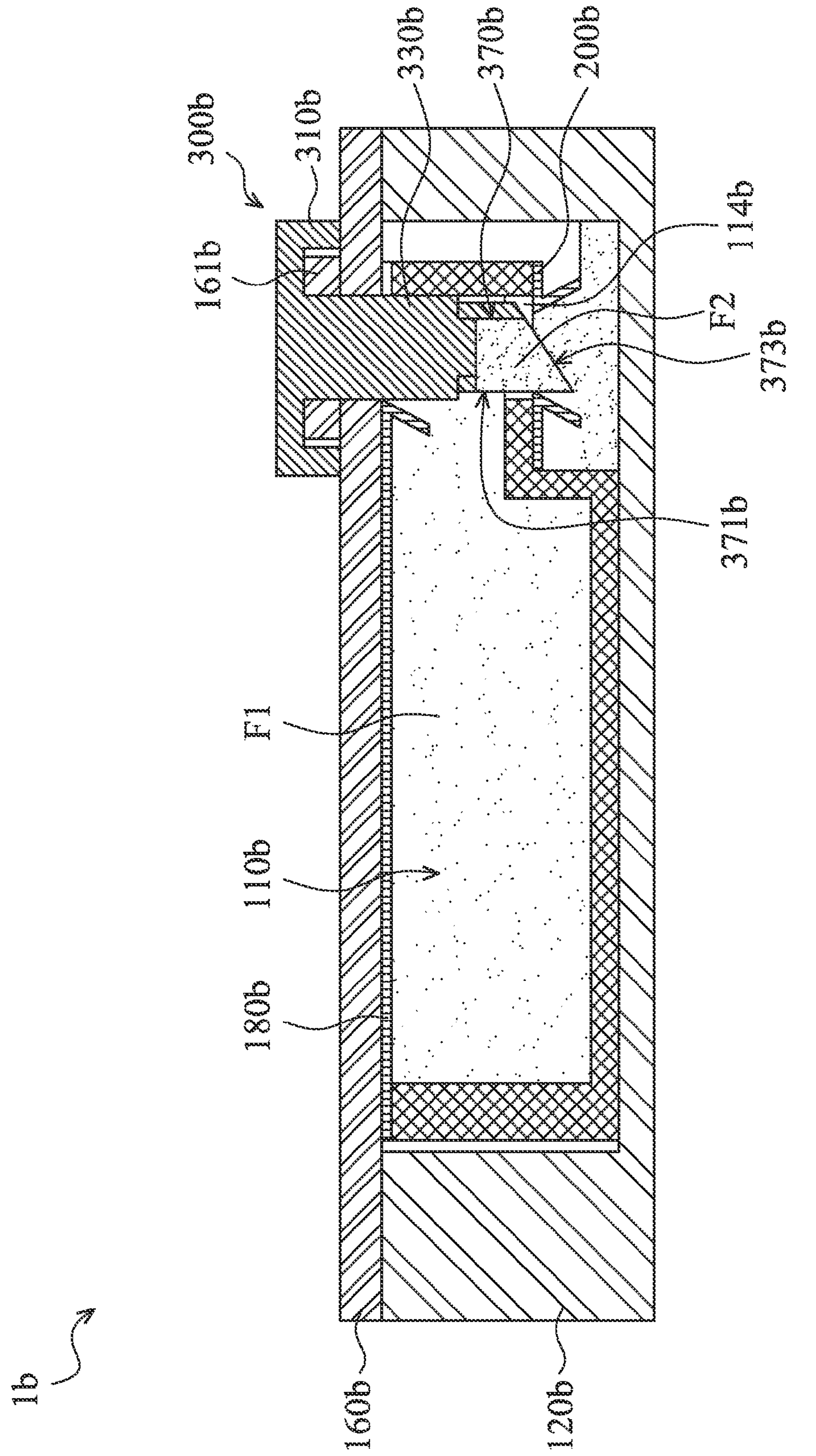
FIG. 6B shows a schematic cross-sectional view of the testing module of the second embodiment of the disclosure with the block structure in a first state.

Afterwards, as shown in FIG. 6B, after the connection of the sampling assembly 300*b* and the carrier 100*b*, the sampling member 330*b* is disposed in the flow path 130*b*, and the membrane 180*b* and the block structure 200*b* relative to the guiding hole 161*b* are piercingly penetrated by the puncturing structure 335*b* of the sampling member 330*b*. At this moment, the block structure 200*b* is in a second state, in which the membrane (the block structure 200*b*) is not intact and has a through hole due to being pierced. The fluid F1 flows out of the storage 110*b* via the bottom opening 114*b*, wherein the fluid F1 can naturally flow out of the storage chamber 110*b* through the force of gravity.

It should be noted that when the fluid F1 flows out of the storage 110*b*, a portion of the fluid F1 flows out of the storage chamber 110*b* via a slit between the sampling member 330*b* and the bottom opening 114*b*, and the other portion of the fluid F1 flows out of the storage chamber 110*b* via the passage 370*b* and mixes with the test sample F2 in the passage 370*b*. Specifically, the fluid F1 flowing through the passage 370*b* enters the passage 370*b* via the fluid inlet 371*b* and leaves the passage 370*b* via the fluid outlet 373*b* together with the test sample F2. In the embodiment, the portion of the flow path 130*b* of the fluid F1 flowing from the storage chamber 110 to the fluid outlet 373*b* via the fluid inlet 371*b* is referred to as the upstream 131*b*, and the other portion of the flow path 130 of the fluid F1 and the test sample F2 flowing from the fluid outlet 373*b* to the mixing chamber 150*b* is referred to as the downstream 133*b*. The viscosity of the fluid F1 is lower than that of the test sample F2 so as to facilitate the fluid F1 flushing the test sample F2 out of the passage 370*b*; however, the embodiment should not be limited thereto. The viscosity of the fluid F1 may be higher than or equal to that of the test sample F2, and the fluid F1 will also enter the passage 370*b* and bring the test sample F2 to the mixing chamber 150*b*.

Referring again to FIG. 5, after the fluid F1 flows out of the storage chamber 110*b*, the fluid F1 is driven to flow into the mixing chamber 150*b* via the downstream 133*b*. At this moment, since the fluid F1 has been already mixed with the test sample F2 before flowing into the mixing chamber 150*b*, the test sample F2 immediately reacts with the reactive reagent F3 once that the fluid F1 flows into the mixing chamber 150*b*. Last, after the reaction of the test sample F2 and the reactive reagent F3 is finished a measurement of the reaction result is performed. Therefore, the process of testing the test sample F2 is completed.

In the second embodiment, the operation of driving the fluid F1 to flow into the mixing chamber 150*b* includes placing the carrier 100*b* as a whole on a rotation plate (not shown), wherein the storage chamber 110*b* is closer to a rotation center of the rotation plate than the mixing chamber 150*b*. Afterwards, the rotation plate is rotated to generate a centrifugal force to drive the fluid F1 to flow. In another embodiment, the operation of driving the fluid F1 to flow out of the storage chamber 110*b* includes providing a pump to drive the fluid F1 to flow.

Third Embodiment

Figure 7:
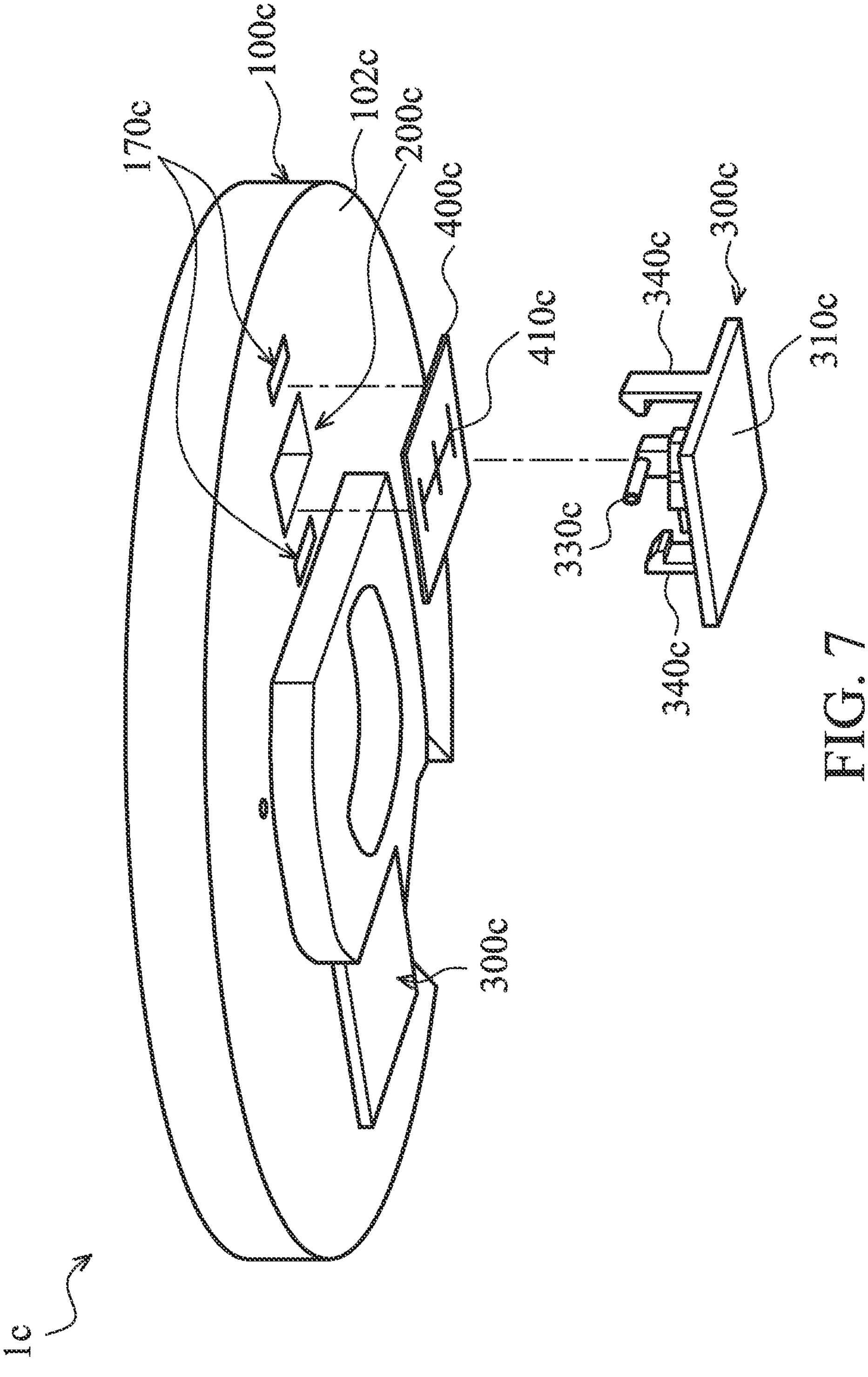
FIG. 7 shows an exploded view of the testing module of a third embodiment of the disclosure.
Figure 8:
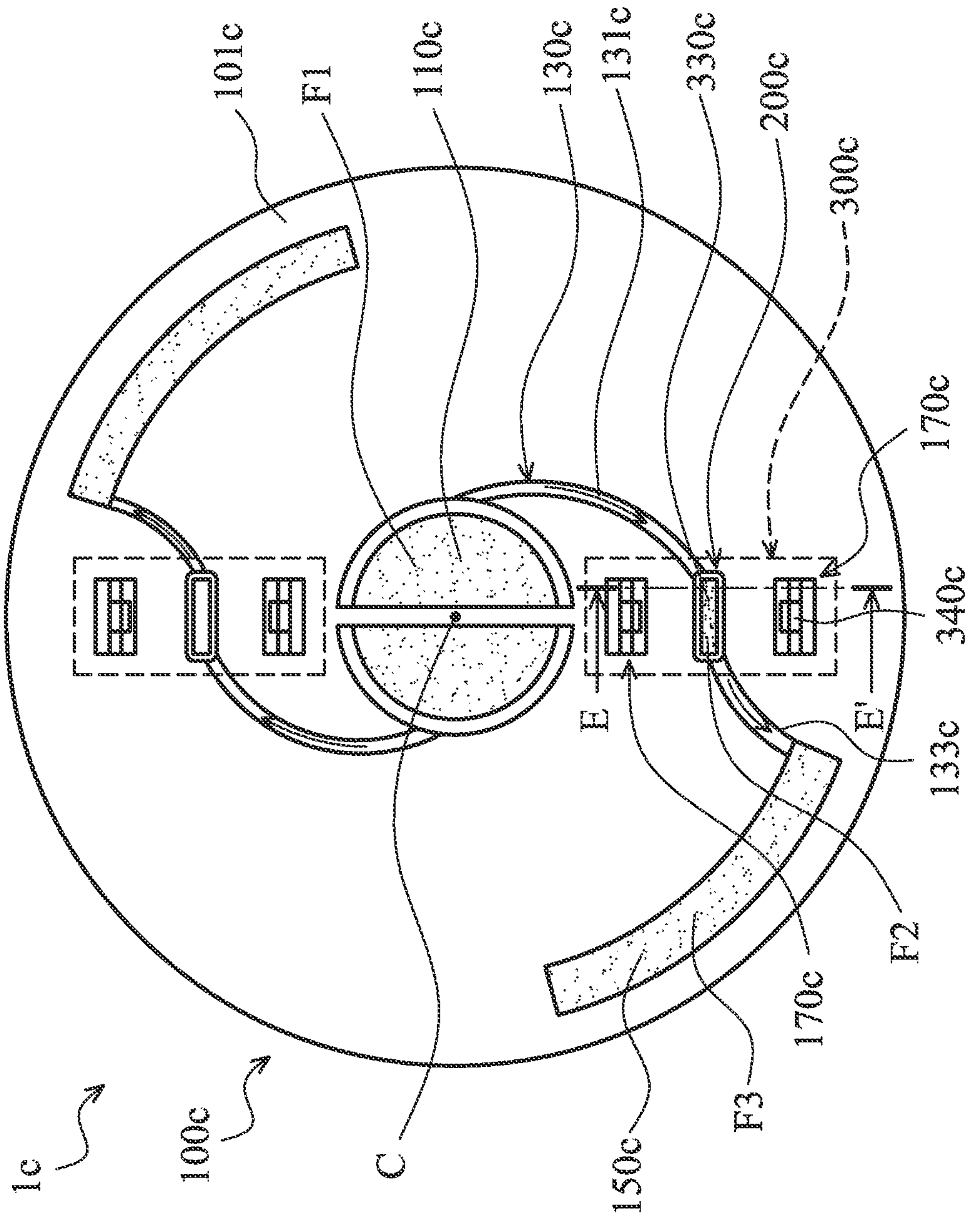
FIG. 8 shows a top view of a portion of the testing module of the third embodiment of the disclosure.

FIG. 7 shows an exploded structural view of the testing module 1*c* of a third embodiment of the disclosure, and FIG. 8 shows a top view of a portion of the structure of the testing module 1*c* of the third embodiment of the disclosure. In the third embodiment, the testing module 1*c* includes a carrier 100*c*, a block structure 200*c*, and one or more sampling assemblies 300*c*.

As shown in FIG. 8, a storage chamber 110*c*, a flow path 130*c*, and a mixing chamber 150*c* are respectively formed on an upper surface 101*c* of the carrier 100*c*. The storage chamber 110*c* and the mixing chamber 150*c* are separated from each other and fluidly connected to each other via the flow path 130*c*. In the embodiment, the position of the storage chamber 110*c* is closer to a substantial center C of the carrier 100*c* than that of the mixing chamber 150*c*. The storage chamber 110*c* may be used to hold a fluid F1, such as salt water or another diluent. The mixing chamber 150*c* may be used to hold a reactive reagent F3, such as reactive material. In some embodiments, the testing module 1*c* further includes a cover or a membrane (not shown in the Figures) to seal the upper surface 101*c* of the carrier 100*c*.

The block structure 200*c* is an opening penetrating the upper and lower surfaces of the carrier 100*c* and disposed between an upstream 131*c* and a downstream 133*c* of the flow path 130*c*. The opening 200*c* has a shape compatible with the shape of the sampling assemblies 300*c*. In addition, as shown in FIG. 7, in the vicinity of the block structure 200*c*, a pair of notches 170*c* is arranged, and a liquid-absorbing material 400*c* is placed on the lower surface 102*c* of the carrier 100*c* relative to the block structure 200*c*. The liquid-absorbing material 400*c* (such as sponge, velvet, non-woven fabric, cotton paper) includes a plurality of central slits 410*c* formed thereon to allow the sampling assembly 300*c* to pass therethrough. The functions of the notches 170*c* and the liquid-absorbing material 400*c* will be described later.

Figure 9:
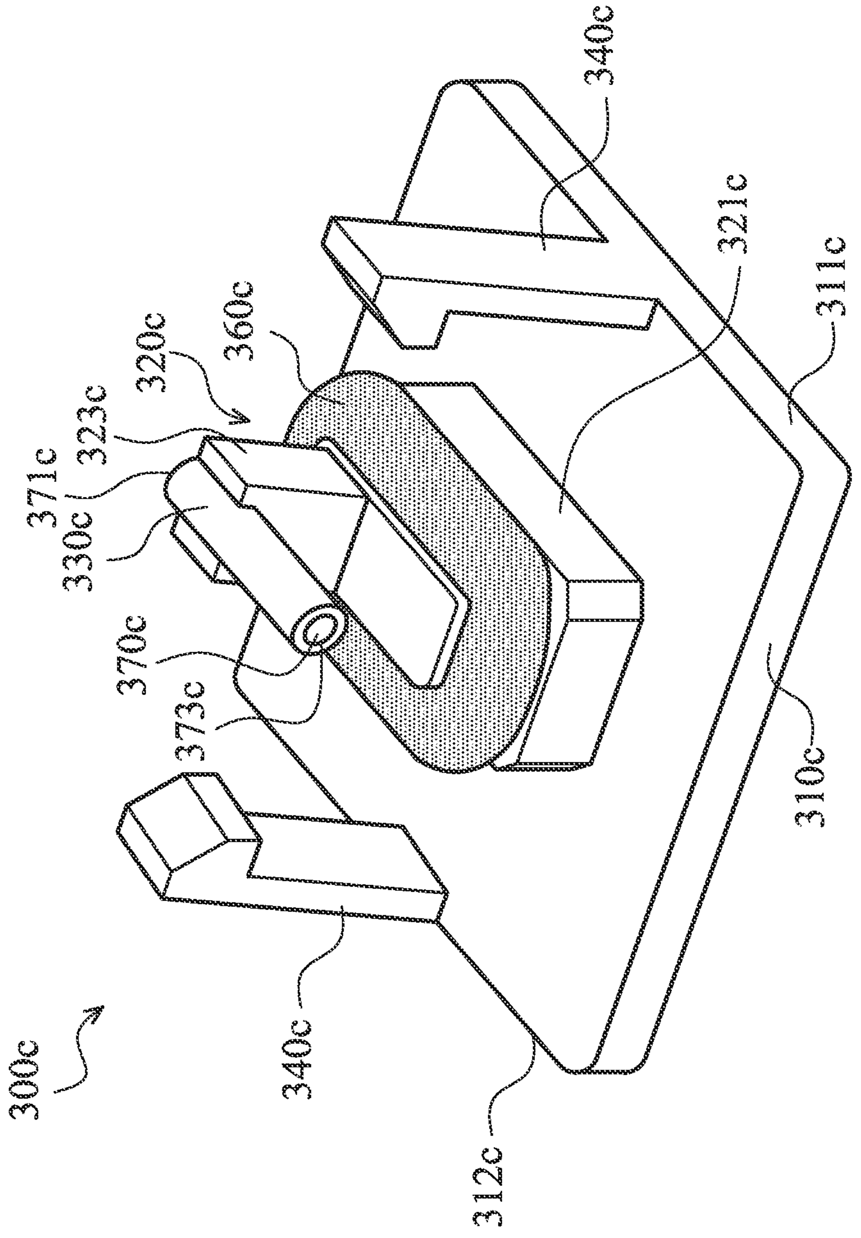
FIG. 9 shows a schematic view of the sampling assembly of the third embodiment of the disclosure.

FIG. 9 shows a schematic view of the sampling assembly 300*c* of the third embodiment of the disclosure. According to the third embodiment, the sampling assembly 300*c* includes a seat 310*c*, a supporting structure 320*c*, a sampling member 330*c*, two clamping structures 340*c* and a sealing member 360*c*. The supporting structure 320*c* and the two clamping structures 340*c* are disposed on the seat 310*c* and protrude from the seat 310*c* along the same direction. Specifically, the supporting structure 320*c* is disposed on a substantial center of the seat 310*c*, and the two clamping structures 340*c* are respectively disposed on two opposite sides of the supporting structure 320*c* and adjacent to the lateral edges 311*c* and 312*c* of the seat 310*c*.

The supporting structure 320*c* includes a first portion 321*c* and a second portion 323*c*. The first portion 321*c* is disposed on the seat 310*c*, and the second portion 323*c* is disposed on the first portion 321*c*. The cross-sectional area of the second portion 323*c* is larger than that of the first portion 321*c*. The sealing member 360*c* is disposed on the first portion 321*c* and completely surrounds the peripheral of the second portion 323*c*. The sampling member 330*c* is disposed on the second portion 323*c*. A passage 370*c* is formed in the center of the sampling member 330*c*. The passage 370*c* is used to collect the test sample F2 such as blood, urine, sputum, semen, feces, pus, tissue fluid, bone marrow, cell test sample, or any other bodily fluid. A fluid inlet 371*c* and a fluid outlet 373*c* are formed at two end of the passage 370*c*, and fluid can flow through the passage 370*c* via the fluid inlet 371*c* and the fluid outlet 373*c*. In some embodiments, the positions of the fluid outlet 373*c* and the fluid inlet 371*c* may be inter changed.

The operation method of testing the test sample F2 by the testing module 1*c* according to the third embodiment of the disclosure is described below.

Referring again to FIG. 8, in the beginning, the fluid F1 is provided in the storage chamber 110*c*, and the reactive reagent F3 is provided in the mixing chamber 150*c*. In the third embodiment, before the connection of the sampling assembly 300*c* and the carrier 100*c*, the block structure 200*c* is in a first state, in which the block structure 200*c* is not closed. In some embodiments, the storage chamber 110*c* is lower than the flow path 130*c* (such as the structural features of the storage chamber 110*a* and the flow path 130*a* shown in FIG. 3A), so that the fluid F1 is prevented from flowing out of the storage chamber 110*c*. The fluid F1 may flow out of the storage chamber 110*c* due to a swinging motion of the carrier 100*c*. However, due to the arrangement of the block structure 200*c*, the fluid F1 is released via the block structure 200*c* and is absorbed by the liquid-absorbing material 400*c* and thus is limited not to flow into the mixing chamber 150*c* via the flow path 130*c*. Therefore, the reactive reagent F3 can be prevented from being contaminated by the fluid F1.

Afterwards, the test sample F2 is collected in the passage 370*c* by the sampling assembly 300*c* and kept in the passage 370*c* through capillary force. Afterwards, the sampling assembly 300*c* is transported to connect to the carrier 100*c*.

Figure 10:
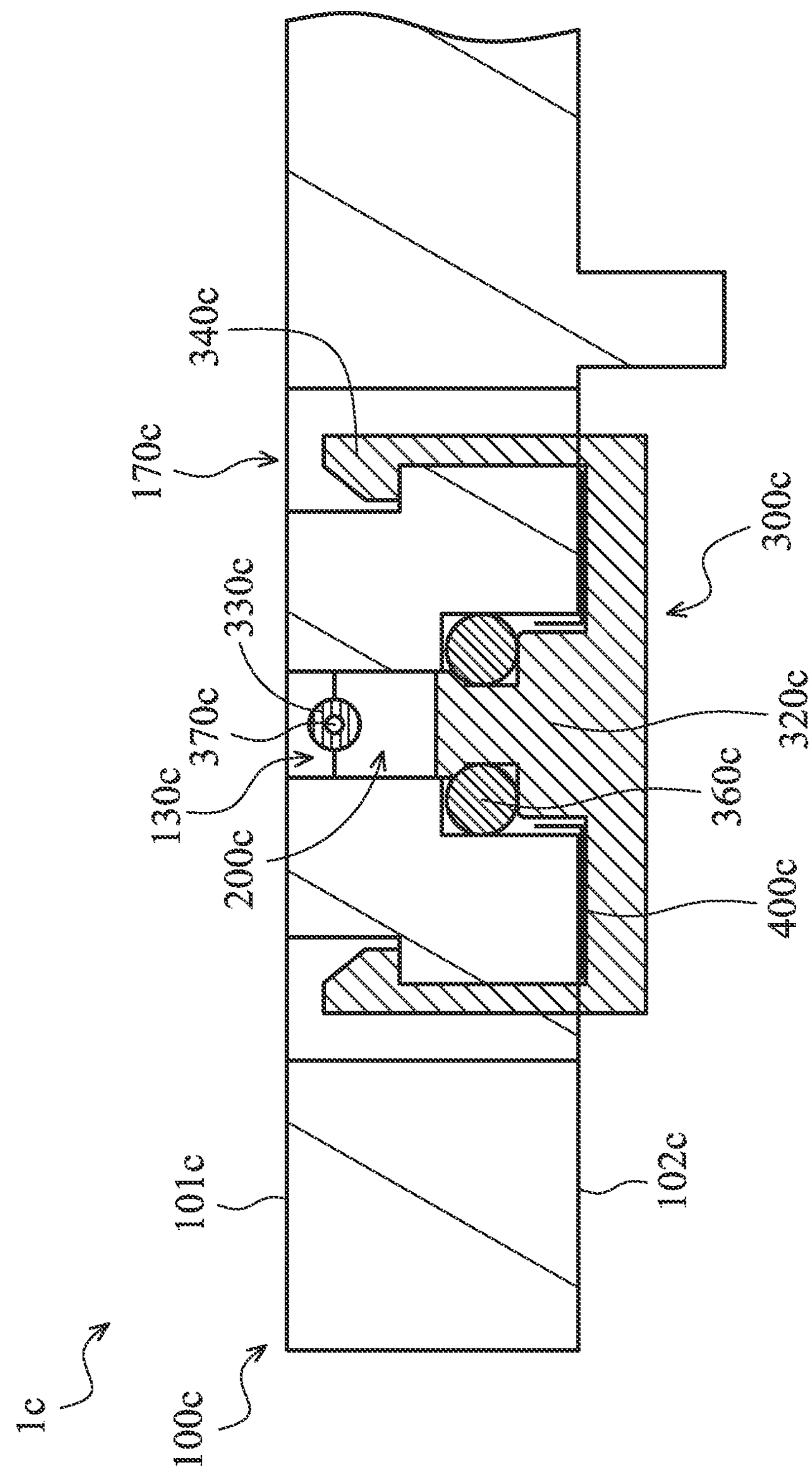
FIG. 10 shows a schematic cross-sectional view taken along line E-E' of FIG. 8.

Specifically, as shown in FIG. 10, during the connection of the sampling assembly 300*c* to the carrier 100*c*, the supporting structure 320*c* and the sampling member 330*c* are inserted into the block structure 200*c*, and the two clamping structure 340*c* are respectively inserted in to the two notches 170*c*. Since the supporting structure 320*c* and the sampling member 330*c* first pass through the central slits 410*c* of the liquid-absorbing material 400*c* before reaching into the block structure 200*c*, the excess test sample F2 on the sampling member 330*c* is absorbed by the liquid-absorbing material 400*c*. This arrangement is such that the precision of the test result can be improved.

After the sampling assembly 300*c* is completely connected to the carrier 100*c*, the two clamping structures 340*c* are respectively engaged with the two notches 170*c*, and the sampling member 330*c* is disposed in the flow path 130*c*. In addition, the sealing member 360*c* is deformed due to compression of an inner wall of the block structure 200*c*. At this moment, the block structure 200*c* is in a second state, in which the block structure 200*c* is sealed by the sampling assembly 300*c*.

Afterwards, as shown in FIG. 8, when the block structure 200*c* is in the second state, the fluid F1 is driven to flow from the storage chamber 110*c* to the sampling assembly 300*c* and mixed with test sample F2 collected by the sampling assembly 300*c*. Specifically, the fluid F1 is driven to flow out of the storage chamber 110*c* and pass through the upstream 131*c*, the sampling assembly 300*c*, and the downstream 133*c* before flowing into the mixing chamber 150*c*.

It should be noted that when the fluid F1 passes through the sampling assembly 300*c*, a portion of the fluid F1 flows to the downstream 133*c* via an slit between the sampling member 330*c* and an inner wall of the flow path 130*c*, and the other portion of the fluid F1 flows to the downstream 133*c* via the passage 370*c* (FIG. 9) and mixes with the test sample F2 in the passage 370*c*. Specifically, the fluid F1 enters the passage 370*c* via the fluid inlet 371*c* (FIG. 9) of the passage 370*c* and leaves the passage 370*c* via the fluid outlet 373*c* (FIG. 9) of the passage 370*c* together with the test sample F2. Since the fluid F1 has been already mixed with the test sample F2 before flowing into the mixing chamber 150*c*, the test sample F2 immediately reacts with the reactive reagent F3 once that the fluid F1 flows into the mixing chamber 150*c*. Last, after the reaction of the test sample F2 and the reactive reagent F3 is finished a measurement of the reaction result is performed. The process of testing the test sample F2 is completed.

In the third embodiment, the operation of driving the fluid F1 to flow out of the storage chamber 110*c* includes rotating the carrier 100*c* about the substantial center C of the carrier 100*c* to generate a centrifugal force to drive the fluid F1 to flow. In another embodiment, the operation of driving the fluid F1 to flow out of the storage chamber 110*c* includes providing a pump to drive the fluid F1 to flow.

Fourth Embodiment

Figure 11:
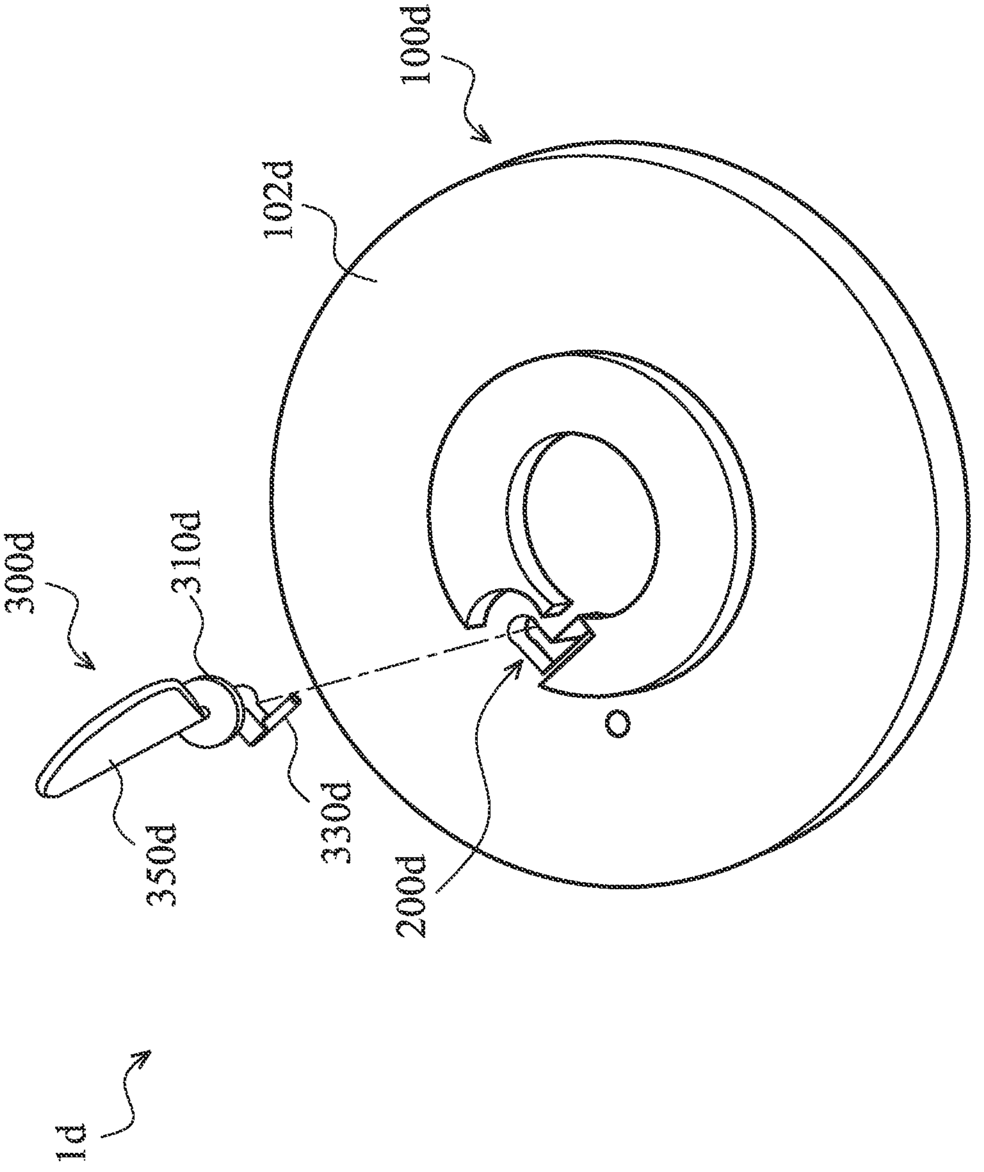
FIG. 11 shows an exploded view of a testing module of a fourth embodiment of the disclosure.
Figure 12:
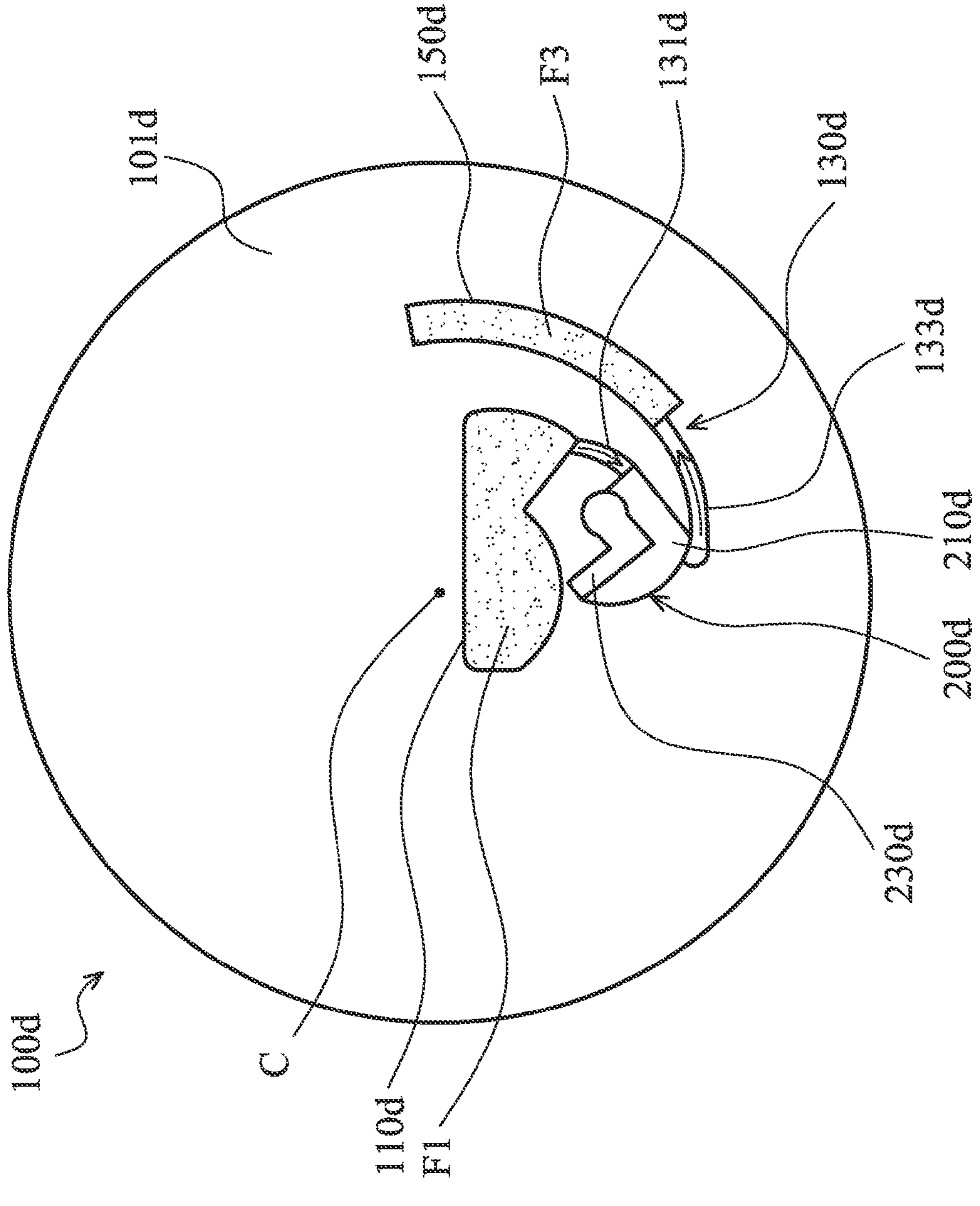
FIG. 12 shows a top view of a carrier of the fourth embodiment of the disclosure.

FIG. 11 shows an exploded structural view of the testing module 1*d* of a fourth embodiment of the disclosure, and FIG. 12 shows a top view of a portion of the structure of the testing module 1*d* of the fourth embodiment of the disclosure. In the fourth embodiment, the testing assembly 1*d* includes a carrier 100*d*, a block structure 200*d*, and a sampling assembly 300*d*.

As shown in FIG. 12, a storage chamber 110*d*, a flow path 130*d*, and a mixing chamber 150*d* are respectively formed on an upper surface 101*d* of the carrier 100*d*. The storage chamber 110*d* and the mixing chamber 150*d* are separated from each other and fluidly connected to each other via the flow path 130*d*. In the embodiment, the position of the storage chamber 110*d* is closer to a substantial center C of the carrier 100*d* than that of the mixing chamber 150*d*. The storage chamber 110*d* may be used to hold a fluid F1, such as salt water or another diluent. The mixing chamber 150*d* may be used to hold a reactive reagent F3, such as reactive material. In some embodiments, the testing module 1*d* further includes a cover or a membrane (not shown in the Figures) to seal the upper surface 101*d* of the carrier 100*d*.

The block structure 200*d* includes a recess 210*d* and an opening 230*d*. The recess 210*d* is formed on the upper surface 101*d* of the carrier 100*d* and positioned between an upstream 131*d* and a downstream 133*d* of the flow path 130*d* and has a bottom surface 215. The opening 230*d* is formed at the lower surface 102*d* of the carrier 100*d* and penetrates the lower surface 102*d* of the carrier 100*d* and the bottom surface 215 of the recess 210*d* and has a substantially L-shape and communicates with the recess 210*d*.

Figure 13:
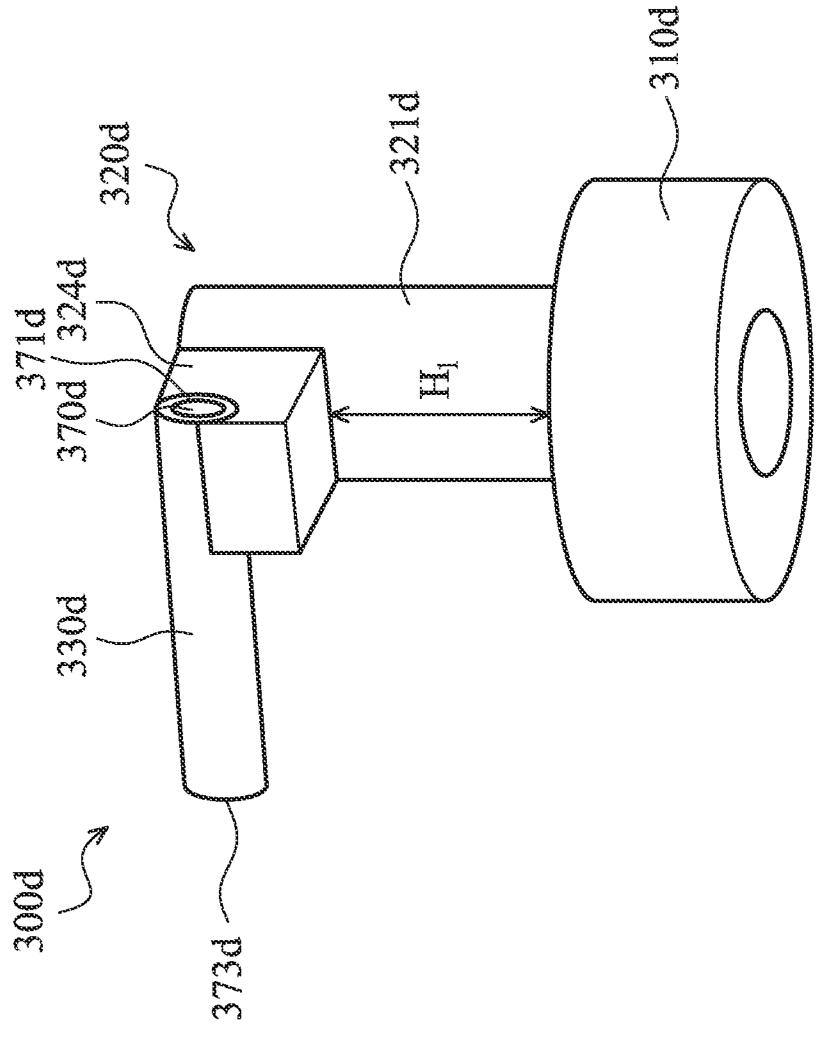
FIG. 13 shows a schematic view of a sampling assembly of the fourth embodiment of the disclosure.

FIG. 13 shows a schematic view of the sampling assembly 300*d* of the fourth embodiment of the disclosure. According to the fourth embodiment, the sampling assembly 300*d* includes a seat 310*d*, a supporting structure 320*d*, a sampling member 330*d*, and a handle 350*d* (FIG. 11). The supporting structure 320*d* is disposed on the seat 310*d* and protrudes from the seat 310*d* along a predetermined direction. In the fourth embodiment, the supporting structure 320*d* further includes a cylinder 321*d* and a protrusion 324*d* radially protruding from the vicinity of a distal end of the cylinder 321*d*, wherein the sampling member 330*d* is disposed on the protrusion 324*d*. A passage 370*d* is formed in the center of the sampling member 330*d*. The passage 370*d* is used to collect the test sample F2 such as blood, urine, sputum, semen, feces, pus, tissue fluid, bone marrow, cell sample, or any other bodily fluid. A fluid inlet 371*d* and a fluid outlet 373*d* are formed at two end of the passage 370*d*, and fluid can flow through the passage 370*d* via the fluid inlet 371*d* and the fluid outlet 373*d*. In some embodiments, the testing module 1*d* further includes a liquid-absorbing material (as the liquid-absorbing material 400*c* shown in FIG. 7) disposed on the lower surface 102*d* of the carrier 100*d* relative to the opening 230*d* of the block structure 200*d* to absorb excess test sample on the sampling assembly 300*d*.

The operation method of testing the test sample F2 by the testing module 1*d* according to the fourth embodiment of the disclosure is described below.

Referring again to FIG. 12, in the beginning, the fluid F1 is provided in the storage chamber 110*d*, and the reactive reagent F3 is provided in the mixing chamber 150*d*. In the fourth embodiment, before connecting the sampling assembly 300*d* to the carrier 100*d* through the opening 230*d* at the lower surface 102_d_ of the carrier 100_d_, the block structure 200_d_ is in a first state, in which the block structure 200_d_ is not closed. In the embodiment, the storage chamber 110_d_ is lower than the flow path 130_d_ (such as the structural features of the storage chamber 110_a_ and the flow path 130_a_ shown in FIG. 3A), so that the fluid F1 is prevented from flowing out of the storage chamber 110_d_. The fluid F1 may flow out of the storage chamber 110_d_ due to a swinging motion of the carrier 100_d_. However, due to the arrangement of the block structure 200_d_ in which the recess 210_d_ is lower than the flow path 130_d_, the fluid F1 may be released via the opening 230_d_ of the block structure 200_d_ and may be absorbed by the liquid-absorbing material and is limited not to flow into the mixing chamber 150_d_ via the flow path 130_d_. Therefore, the reactive reagent F3 can be prevented from being contaminated by the fluid F1.

Figure 14A:
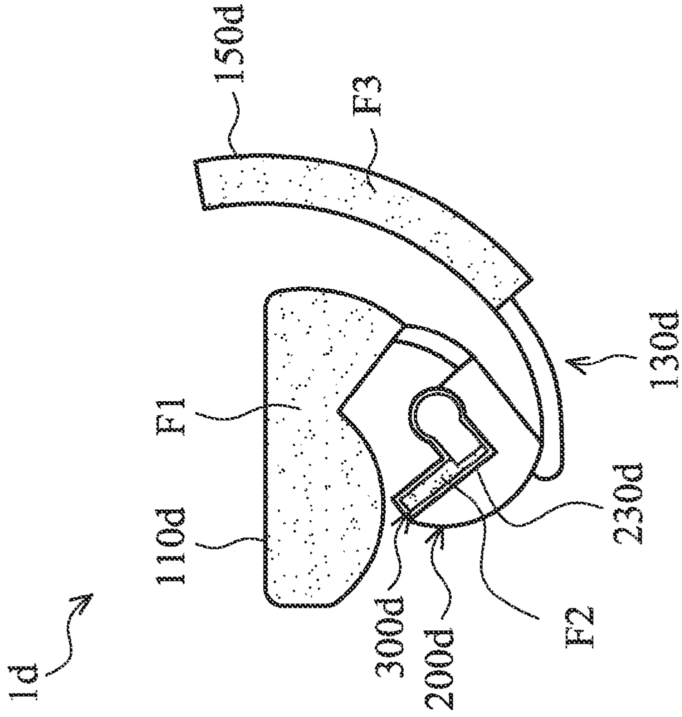
FIGS. 14A-14C show top views of operations of connecting the sampling assembly to the carrier of the fourth embodiment of the disclosure.
Figure 14B:
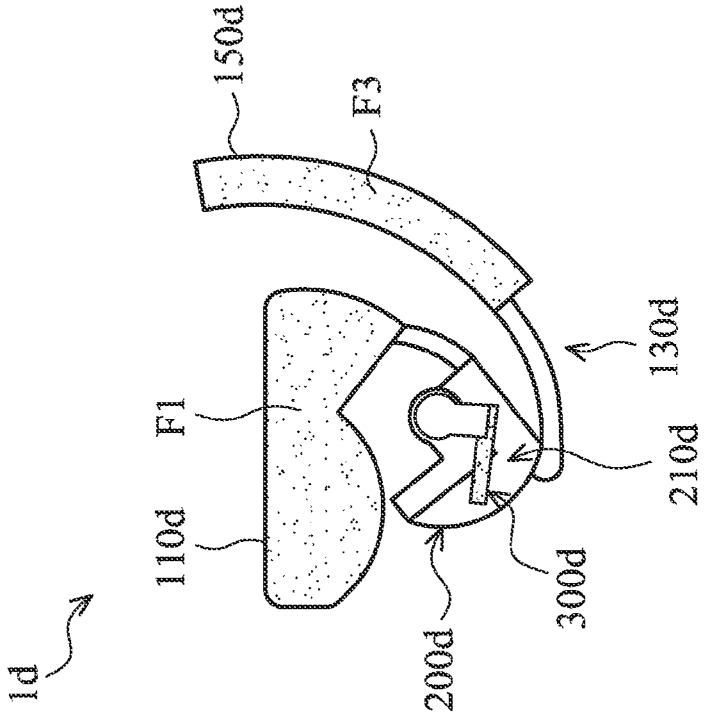
Figure 14C:
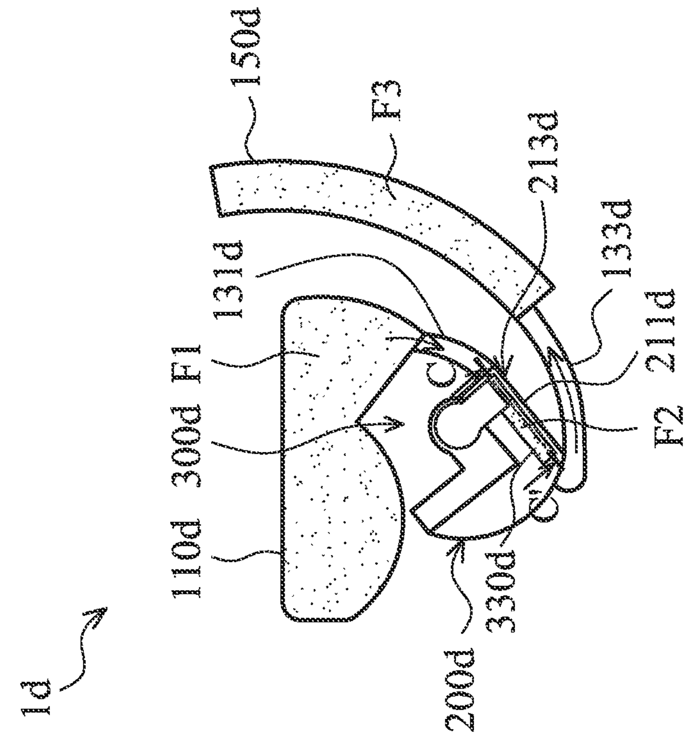

Referring to FIGS. 14A-14C, afterwards, the test sample F2 is collected in the passage 370_d_ by the sampling assembly 300_d_ and kept in the passage 370_d_ through capillary force. Afterwards, the sampling assembly 300_d_ is transported and connected to the carrier 100_d_. The method for connecting the sampling assembly 300_d_ and the carrier 100_d_ is described below. First, as shown in FIG. 14A, insert the supporting structure 320_d_ and the sampling member 330_d_ into the through hole 230_d_ of the block structure 200_d_. Afterwards, as shown in FIG. 14B, the sampling assembly 300_d_ is rotated until the sampling member 330_d_ abuts the inner wall 211_d_ of the c and the sampling member 330_d_ is placed in the flow path 130_d_. At this moment, the block structure 200_d_ is in a second state, in which the sampling member 330_d_ is positioned between the upstream 131_d_ and the downstream 133_d_ of the flow path 130_d_. Afterwards, as shown in FIG. 14C, the fluid F1 is driven to flow from the storage chamber 110_d_ to the sampling assembly 300_d_ and mixed with the test sample F2 collected by the sampling assembly 300_d_. Specifically, the fluid F1 is driven to flow out of the storage chamber 110_d_ and pass through the upstream 131_d_, the sampling assembly 300_d_, and the downstream 133_d_ before flowing into the mixing chamber 150_d_.

It should be noted that when the fluid F1 passes through the sampling assembly 300_d_, a portion of the fluid F1 flows to the downstream 133_d_ via an slit 213_d_ between the sampling member 330_d_ and the inner wall 211_d_ of the flow path 130_d_, and the other portion of the fluid F1 flows to the downstream 133_d_ via the passage 370_d_ (FIG. 13) and mixes with the test sample F2 in the passage 370_d_. Specifically, the fluid F1 enters the passage 370_d_ via the fluid inlet 371_d_ (FIG. 13) of the passage 370_d_ and leaves the passage 370_d_ via the fluid outlet 373_d_ (FIG. 13) of the passage 370_d_ together with the test sample F2. Since the fluid F1 has been already mixed with the test sample F2 before flowing into the mixing chamber 150_d_, the test sample F2 immediately reacts with the reactive reagent F3 once that the fluid F1 flows into the mixing chamber 150_d_. Last, after the reaction of the test sample F2 and the reactive reagent F3 is finished a measurement of the reaction result is performed. The process of testing the test sample F2 is completed.

Figure 15:
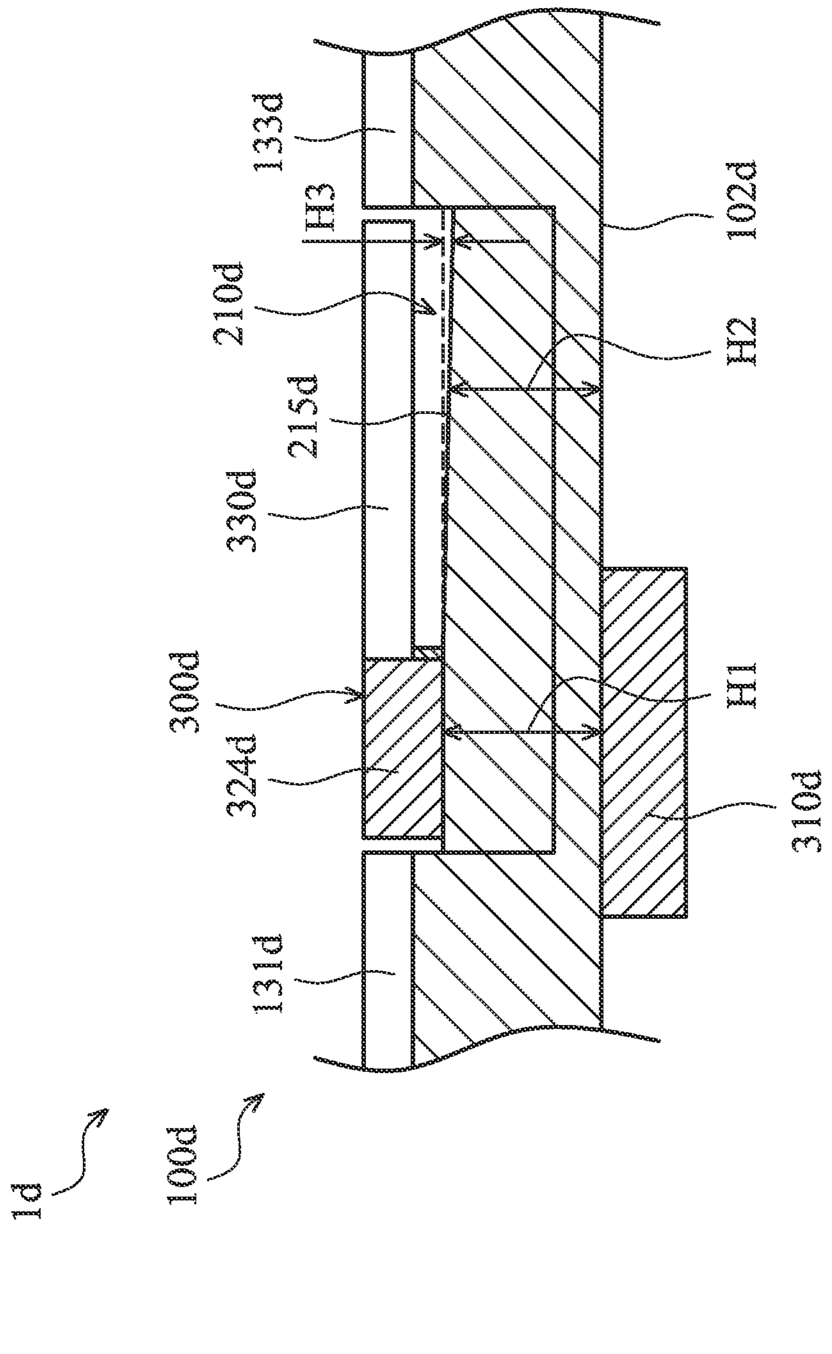
FIG. 15 shows a schematic cross-sectional view of a portion of the testing assembly of the fourth embodiment of the disclosure taken along line C-C' of FIG. 14C.

FIG. 15 shows a schematic cross-sectional view of a portion of the structure of the testing assembly 1_d_ of the fourth embodiment of the disclosure taken along line C-C' of FIG. 14C. In some embodiments, the protrusion 324_d_ and the seat 310_d_ is spaced by a distance H1, and the bottom surface 215 of the recess 210_d_ and the lower surface 102_d_ of the carrier 100_d_ is spaced by a distance H2. The distance H1 may be greater than or equal to the distance H2. The bottom surface 215_d_ of the recess 210_d_ includes an inclined surface. The distance H2 between the bottom surface 215_d_ of the recess 210_d_ and the lower surface 102_d_ of the carrier 100_d_ is varied. For example, a region of the bottom surface 215_d_ adjacent to the upstream 131_d_ is higher than another region of the bottom surface 215_d_ adjacent to the downstream 133_d_, and a height difference H3 is defined between the two regions. With the height difference H3, the sampling assembly 300_d_ may smoothly rotate within the recess 210_d_ of the carrier 100_d_, and after the rotation of the sampling assembly 300_d_ on the carrier 100_d_, the protrusion 324_d_ abuts the bottom surface 215_d_ of the recess 210_d_ tightly, and the sampling assembly 300_d_ is prevented from being dropped. The sampling assembly 300_d_ is firmly engaged with the carrier 100_d_.

Fifth Embodiment

Figure 16A:
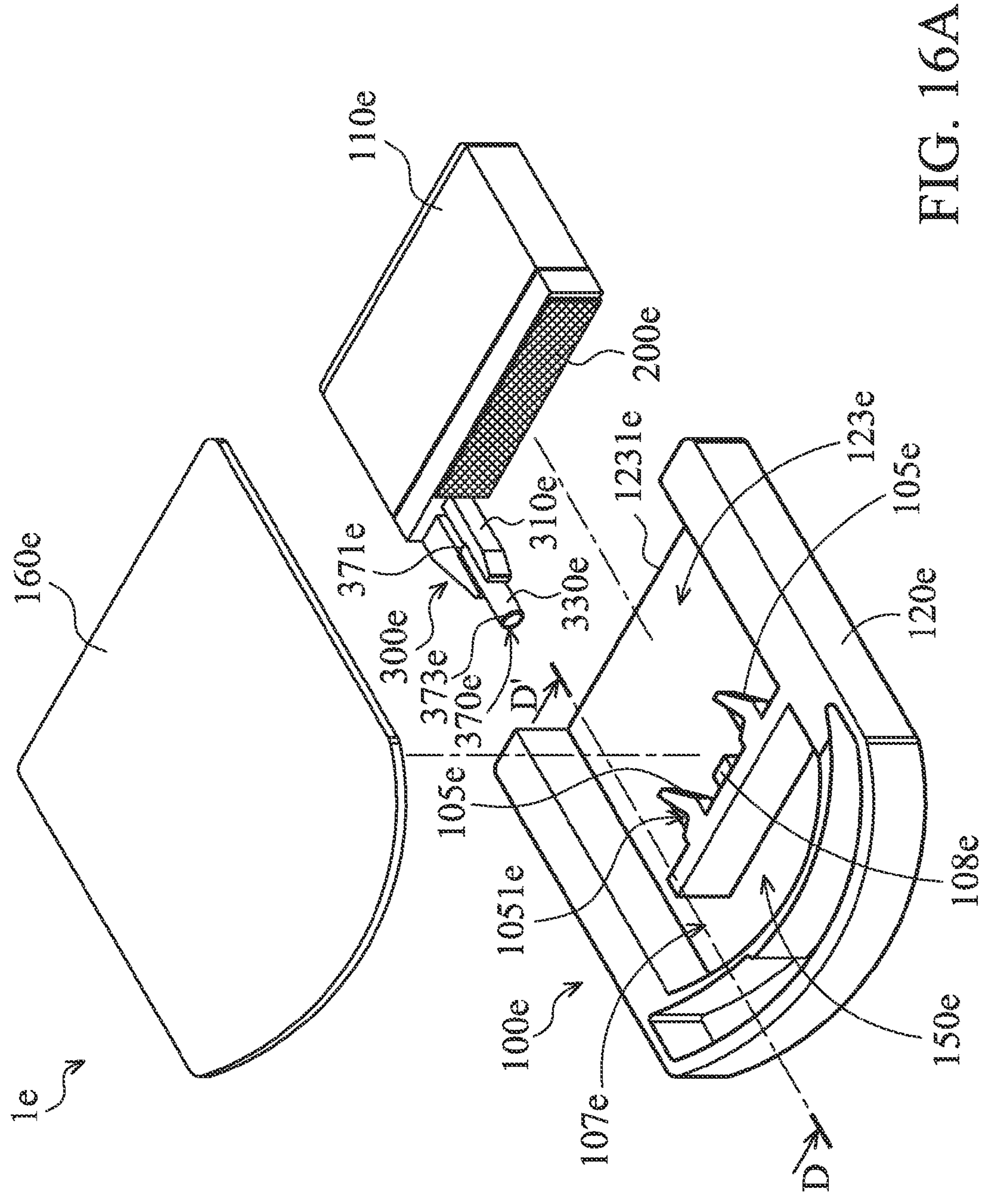
FIG. 16A shows an exploded view of a testing module of a fifth embodiment of the disclosure.

FIG. 16A shows an exploded structural view of a testing module 1_e_ of the fifth embodiment of the disclosure. In the fifth embodiment, the testing module 1_e_ includes a carrier 100_e_, a storage chamber 110_e_, a cover 160_e_, a block structure 200_e_, and a sampling assembly 300_e_.

The carrier 100_e_ includes a base 120_e_, an accommodating space 123_e_, a mixing chamber 150_e_, and one or more pyramid shaped puncturing structures 105_e_. The accommodating space 123_e_ is formed on an upper surface of the base 120_e_ and arranged adjacent to a top lateral edge 1231_e_ of the base 120_e_. The mixing chamber 150_e_ is formed on the upper surface of the base 120_e_ and arranged adjacent to the accommodating space 123_e_. The accommodating space 123_e_ communicates with the mixing chamber 150_e_ via a through hole 107_e_. The cover 160_e_ covers the upper surface of the base 120_e_, so as to seal the accommodating space 123_e_ and the mixing chamber 150_e_.

Figure 16B:
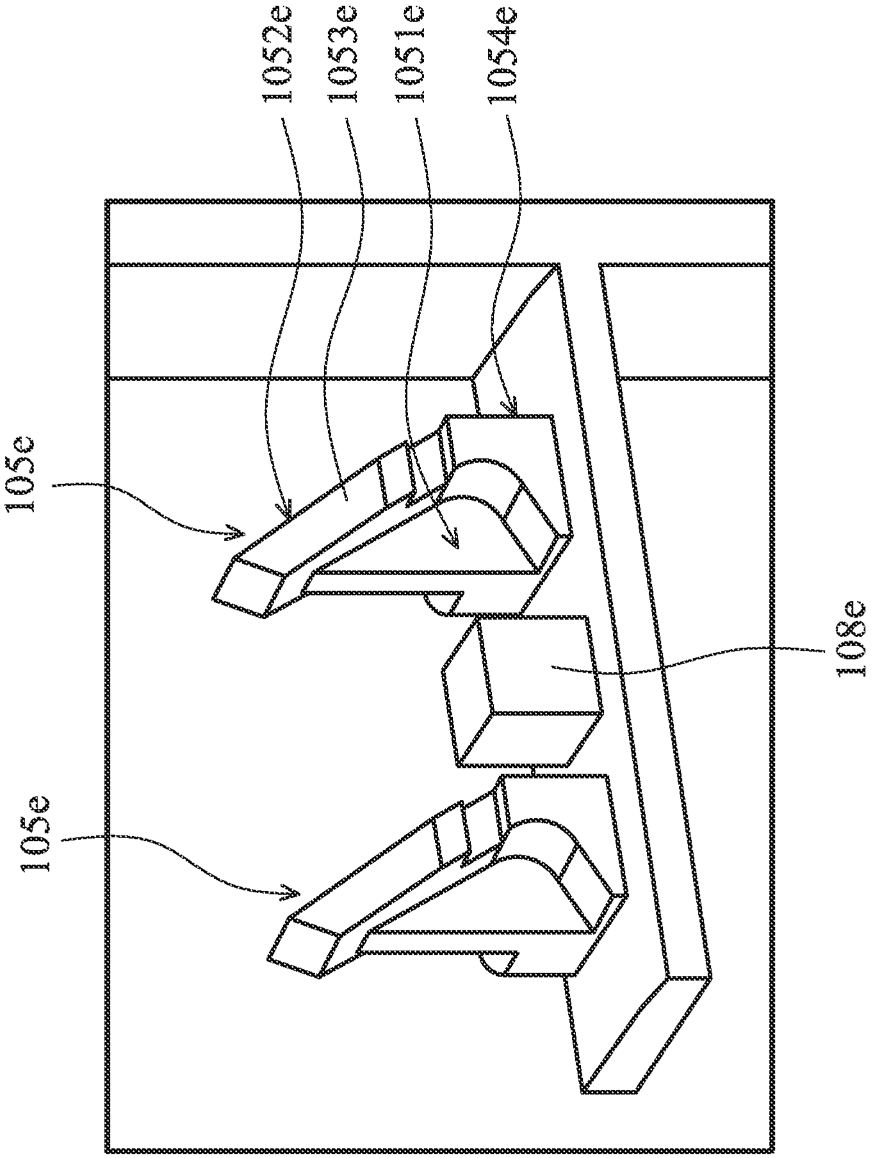
FIG. 16B shows a schematic view of partial of a carrier of a fifth embodiment of the disclosure.
Figure 16C:
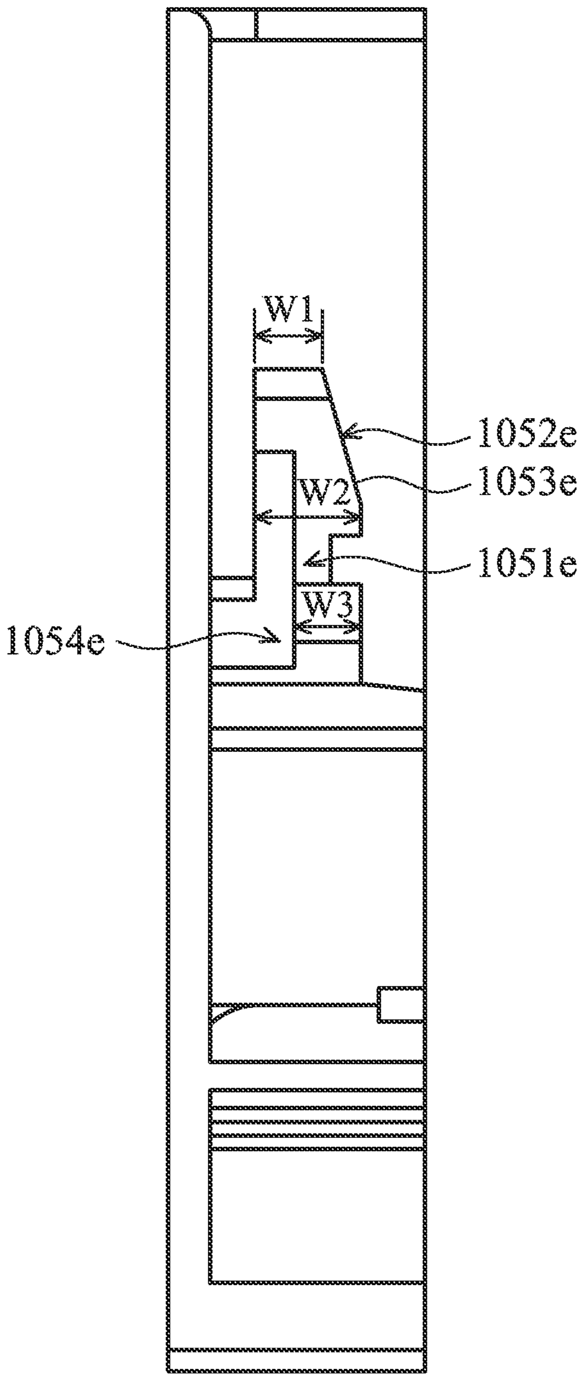
FIG. 16C shows a side view of partial of a carrier of a fifth embodiment of the disclosure observed from line D-D' of FIG. 16A.

The puncturing structures 105_e_ are positioned in the accommodating space 123_e_ and extend toward the top lateral edge 1231_e_ and terminate at its end portion. As shown in FIG. 16B, each of the puncturing structures 105_e_ includes a bottom portion 1054_e_ and a top portion 1052_e_ positioned on the bottom portion 1054_e_. The top portion 1052_e_ has a triangular cross section shape and has a piercing part. However, the shape of the top portion 1052_e_ can be made in any shape as long as there is a piercing part formed thereon. In addition, as shown in FIG. 16C, a lateral surface 1053_e_ relative to the top portion 1052_e_ is an inclined surface. Therefore, the width of the top portion 1052_e_ is varied. For example, the width of the top portion 1052_e_ is increased from a width W1 to a width W2 along a direction toward the bottom portion 1054_e_. In other embodiments, the width W1 may be equal to or greater than the width W2. In some embodiments, each of the puncturing structures 105_e_ has a depressed portion 1051_e_ depressed from the lateral surface 1053_e_ of the puncturing structures 105_e_ for allowing fluid passing therethrough and for facilitating the flowing of the fluid out of the storage chamber. The depressed portion 1051_e_ has a depth of W3 which is smaller than or equal to the width W2. In addition, a supporting member 108_e_ (FIG. 16B) is formed between the puncturing structures 105_e_ to support the storage chamber 110_e_ after the storage chamber 110_e_ enters the accommodating space 123_e_.

Figure 17:
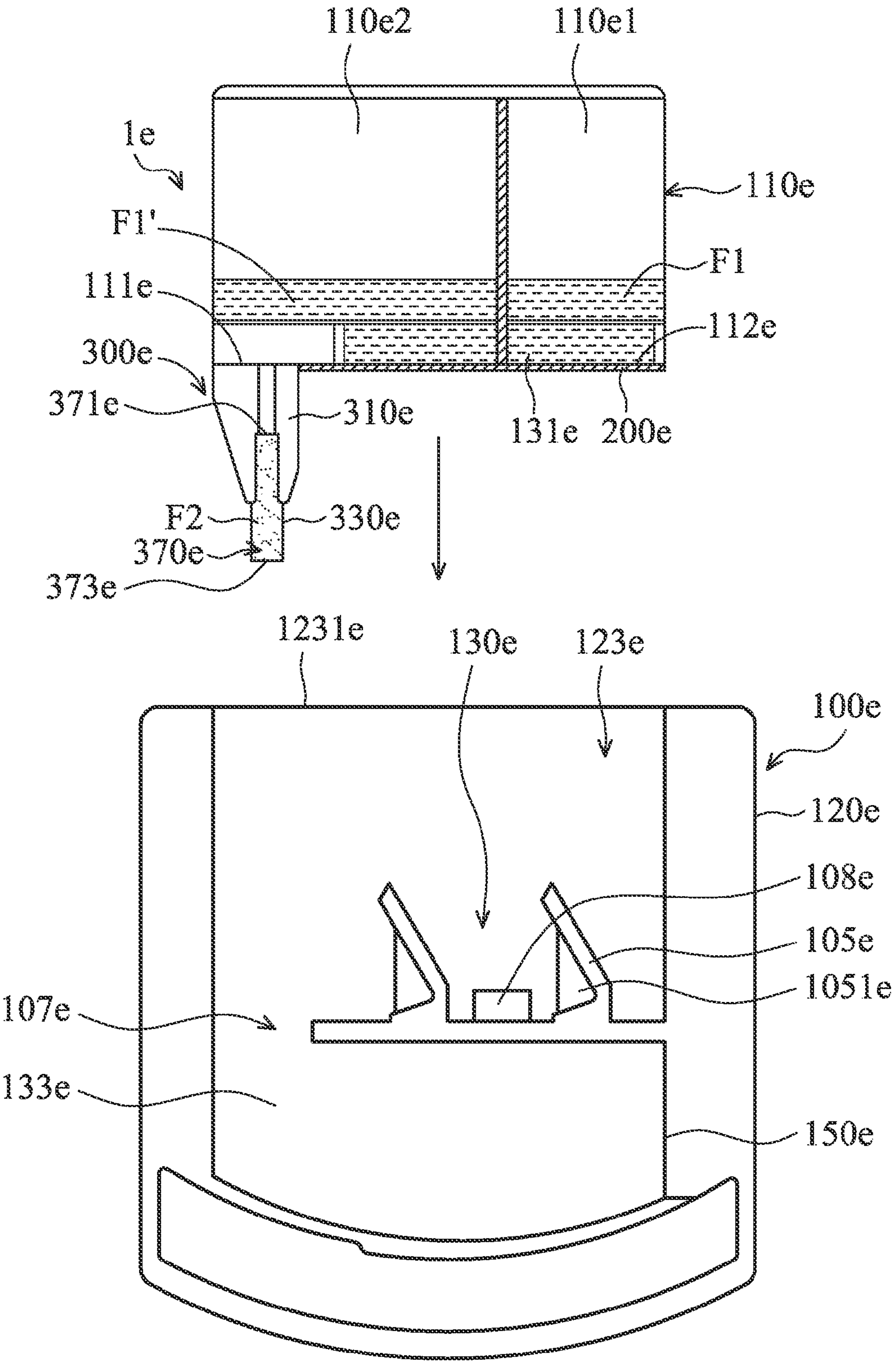
FIG. 17 shows a schematic view of a portion of the testing assembly of the fifth embodiment of the disclosure.

Referring to FIG. 17, in some embodiments, the storage chamber 110_e_ includes a number of storage spaces, such as the storage spaces 110_e_1 and 110_e_2. The storage spaces 110_e_1 and 110_e_2 are secluded by each other. The storage spaces 110_e_1 and 110_e_2 may be used to hold the same or different fluid. For example, in the embodiment shown in FIG. 17, the storage space 110_e_1 holds the fluid F1, such as a reactive reagent, and the storage space 110_e_2 holds the fluid F1', such as a diluent. In some embodiments, the storage chamber 110*e* includes only one storage space with one fluid, and the selection of liquid in the mixing chamber 150*e* is determined according to the liquid held by the storage chamber 110*e*. For example, the mixing chamber 150*e* may hold reactive reagents. Alternatively, there is no liquid in the mixing chamber 150*e*. A bottom opening 112*e* is formed on a lower surface 111*e* of the storage chamber 110*e*. The block structure 200*e* is formed on the lower surface 111*e* of the storage chamber 110*e* relative to the bottom opening 112*e*. In the fifth embodiment, the block structure 200*e* is a membrane, such as an aluminum membrane. The block structure 200*e* may be connected to the lower surface 111*e* of the storage chamber 110*e* by ultrasonic fusing, heat sealing, or laser radiation.

The sampling assembly 300*e* includes a seat 310*e* and a sampling member 330*e*. The seat 310*e* is arranged adjacent to the bottom opening 112*e* and disposed on the lower surface 111*e* of the storage chamber 110*e*. The sampling member 330*e* is disposed on the seat 310*e* and extends along a direction away from the lower surface 111*e* of the storage chamber 110*e*. A passage 370*e* is formed in the sampling member 330*e*. The passage 370*e* is used to collect the test sample F2 such as blood, urine, sputum, semen, feces, pus, tissue fluid, bone marrow, cell test sample, or any other bodily fluid. A fluid inlet 371*e* and a fluid outlet 373*e* are formed at two end of the passage 370*e*, and fluid can flow through the passage 370*e* via the fluid inlet 371*e* and the fluid outlet 373*e*. In the embodiment, the storage chamber 110*e* and the sampling assembly 300*e* are formed integrally by for example, plastic injection molding. Therefore, the storage chamber 110*e* and the sampling assembly 300*e* constitute a single assembly which is served to collect test sample F2 and hold at least fluid F1. However, the storage chamber 110*e* and the sampling assembly 300*e* may be two individual units and made by two different materials such as plastic material and glass. The two units may be connected to each other by a method including screwing or clamping.

In the embodiment, a flow path 130*e* is defined in the testing module 1*e*. Specifically, an upstream 131*e* of the flow path 130*e* is formed in the storage chamber 110*e*, and a downstream 133*e* of the flow path 130*e* is formed in the mixing chamber 150*e*. The fluid F1 and/or the fluid F1' from the storage chamber 110*e* flows to the mixing chamber 150*e* via the flow path 130*e*.

Figure 18:
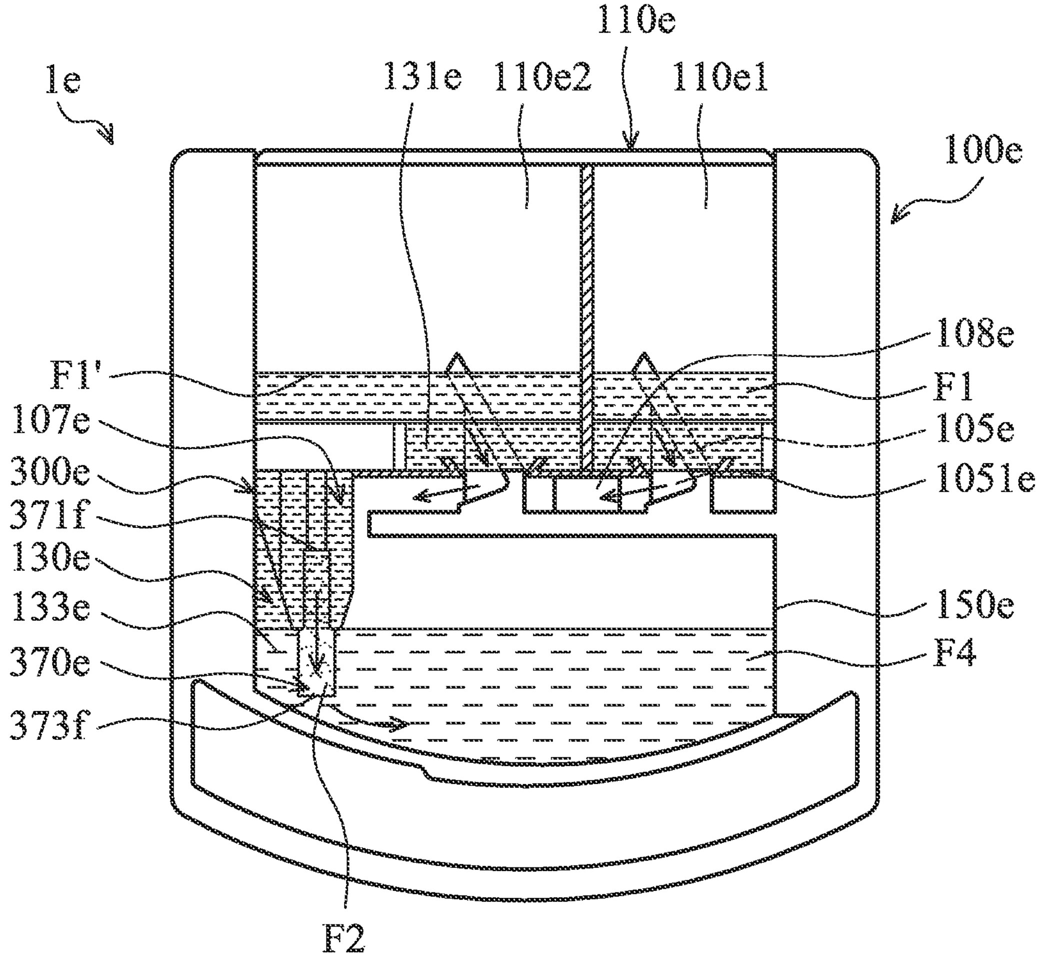
FIG. 18 shows a schematic view after the testing assembly connecting with the carrier of the fifth embodiment of the disclosure.
Figure 19:
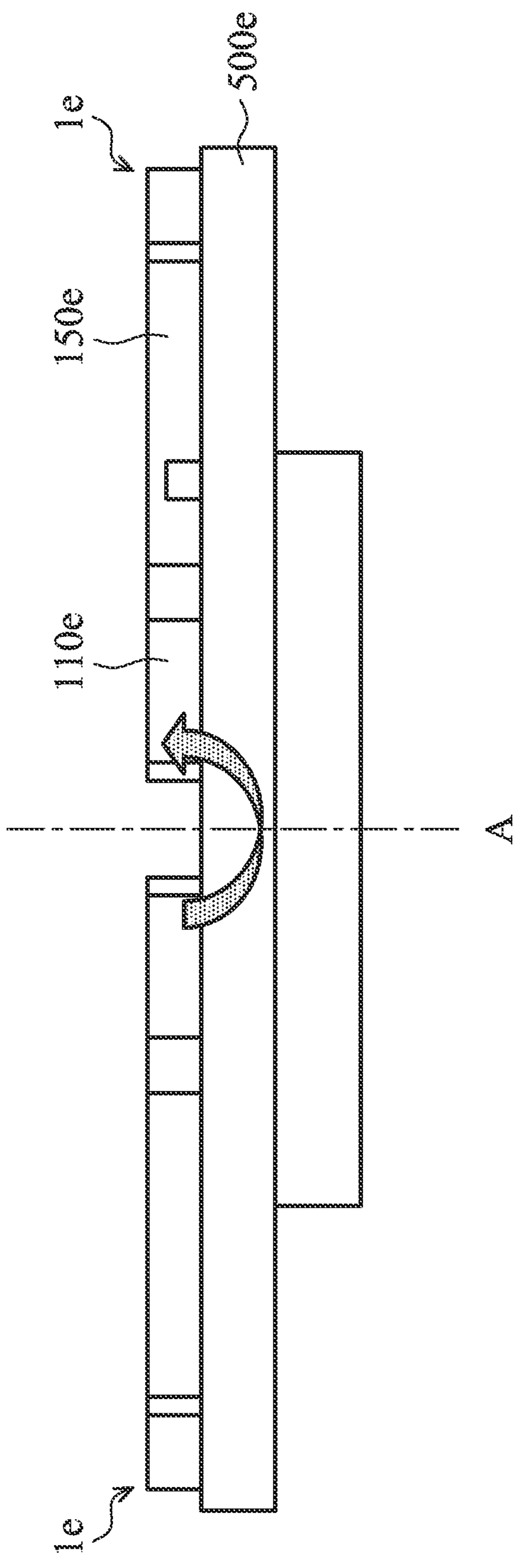
FIG. 19 shows a schematic view of the testing module disposed on a rotation plate in accordance with the fifth embodiment of the disclosure.

Referring to FIGS. 17-19, the operation method of testing the test sample F2 by the testing module 1*e* according to the fifth embodiment of the disclosure is described below.

In the beginning, as shown in FIG. 17, the fluid F1 and/or the fluid F1' is provided in the storage chamber 110*e*. Before the connection of the sampling assembly 300*e* and the carrier 100*e*, the block structure 200*e* is in a first state, in which the storage chamber 110*e* is sealed by the block structure 200*e* so that the fluid F1 is held in the storage chamber 110*e* safely. The first state of the block structure 200*e* refers to the membrane (the block structure 200*e*) is intact without breakage. Afterwards, the test sample F2 is collected in the passage 370*e*. The test sample F2 is kept in the passage 370*b* through capillary force.

Afterwards, the storage chamber 110*e* and the sampling assembly 300*e* are transported along a direction indicated by the arrow shown in FIG. 17 and placed into the accommodating space 123*e* via the top lateral edge 1231*e* of the base 120*e*, wherein the sampling member 330*e* directly faces the through hole 107*e*, and the block structure 200*e* directly faces the puncturing structures 105*e*. It should be noted that during connecting the storage chamber 110*e* and the sampling assembly 300*e* to the carrier 100*e*, the puncturing structures 105*e* penetrate the block structure 200*e* so that the block structure 200*e* transforms to a second state, in which the membrane (the block structure 200*e*) is piercingly penetrated. Afterwards, openings are formed on the membrane 200*e*. The movement of the storage chamber 110*e* and the sampling assembly 300*e* is stopped as the storage chamber 110*e* abuts against the supporting member 108*e*.

At this moment, as shown in FIG. 18, the fluid F1 and/or the fluid F1' flows out of the storage chamber 110*e* via the upstream 131*e*. It is noted that since there are depressed portion 1051*e* formed on the puncturing structures 105*e*, the fluid F1 and/or the fluid F1' from the storage chamber 110*e* can be flow out of the storage chamber 110*e* via the depressed portion 1051*e*. Afterwards, the fluid F1 and/or the fluid F1' are driven to flow into the mixing chamber 150*e* via the downstream 133*e*. Before the fluid F1 and/or the fluid F1' flow into the mixing chamber 150*e*, a portion of the fluid F1 and/or the fluid F1' flows into the mixing chamber 150*e* via the through hole 107*e*, and the other portion of the fluid F1 and/or the fluid F1' flow into the mixing chamber 150*e* via the passage 370*e* after mixing with the test sample F2 in the passage 370*e*. Specifically, the fluid F1 and/or the fluid F1' enter the passage 370*e* via the fluid inlet 371*e* of the passage 370*e* and leaves the passage 370*e* via the fluid outlet 373*e* of the passage 370*e* together with the test sample F2. In the embodiment, the viscosity of the fluid F1 and/or the fluid F1' are lower than that of the test sample F2 so as to facilitate the fluid F1 and/or the fluid F1' flushing the test sample F2 out of the passage 370*e*. In another embodiment, the viscosity of the fluid F1 and/or the fluid F1' are higher than or equal to that of the test sample F2, the fluid F1 and/or the fluid F1' will enter the passage 370*e* and bring the test sample F2 to the mixing chamber 150*e*. In some embodiments, once the fluid F1 and/or the fluid F1' and the test sample F2 enters the mixing chamber 150*e* and are uniformly mixed to form a mixture F4, the reaction between the fluid F1 and/or the fluid F1' and the test sample F2 begins. In some embodiments, if the fluid F1 is a reactive agent and the fluid F1' is a diluent, a reaction of the fluid F1 and the fluid F1' may or may not begin in the passage 370*e*. Last, after the reaction of the fluid F1 and/or the fluid F1' and the test sample F2 is finished a measurement of the reaction result is performed. Therefore, the process of testing the test sample F2 is completed.

Referring to FIG. 19, in the fifth embodiment, the operation of driving the fluid F1 and/or the fluid F1' to flow into the mixing chamber 150*e* includes placing the testing module 1*e* as a whole on a rotation plate 500*e*, wherein the storage chamber 110*e* is closer to a rotation center of the rotation plate 500*e* than the mixing chamber 150*e*. Afterwards, the rotation plate 500*e* is rotated about a rotation axis A so as to generate a centrifugal force to drive the fluid F1 to flow. In another embodiment, the operation of driving the fluid F1 and/or the fluid F1' to flow out of the storage chamber 110*e* includes providing a pump to drive the fluid F1 and/or the fluid F1' to flow.

In the fifth embodiment, while there are two punctuating structures 105*e* are arranged, the number of the punctuating structure 105*e* may be modified according to the number of the storage spaces formed in the storage chamber 110*e*, wherein each punctuating structure 105*e* faces one of the storage spaces to enable the fluid or the reactive reagent in the storage space to be released, and the fluid or the reactive reagent flows into the mixing chamber 150*e* via the through hole 170*e* or the passage 370*e*.

Sixth Embodiment

Figure 20:
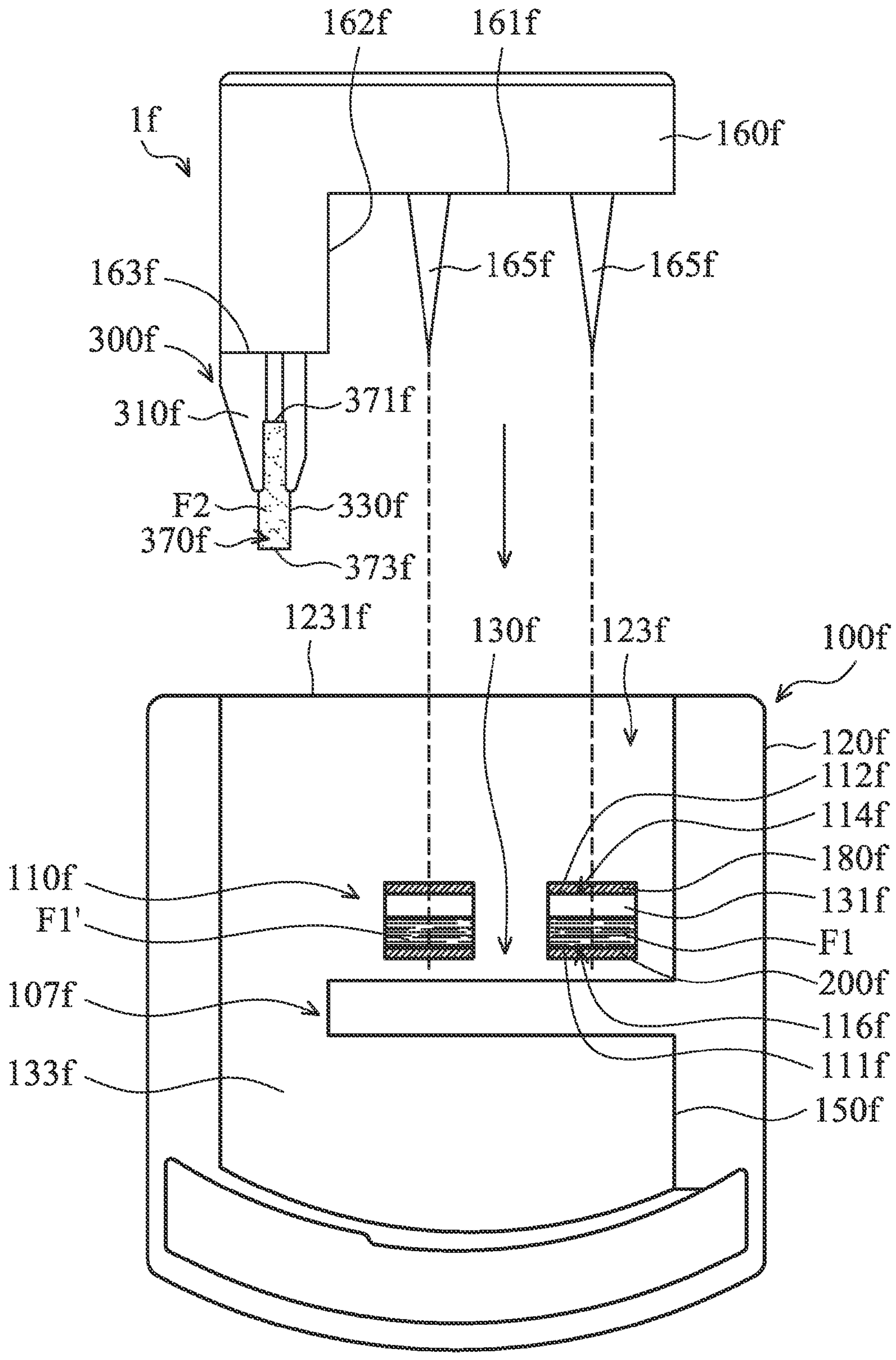
FIG. 20 shows a schematic view of a portion of a testing module of a sixth embodiment of the disclosure.

FIG. 20 shows an exploded structural view of a testing module if of the sixth embodiment of the disclosure. In the sixth embodiment, the testing module if includes a carrier 100*f*, two storage chambers 110*f*, a holder 160*f*, a number of block structures 200*f*, and a sampling assembly 300*f*.

The carrier 100*f* includes a base 120*f*, an accommodating space 123*f*, and a mixing chamber 150*f*. The accommodating space 123*f* is formed on an upper surface of the base 120*f* and arranged adjacent to a top lateral edge 1231*f* of the base 120*f*. The mixing chamber 150*f* is formed on the upper surface of the base 120*f* and arranged adjacent to the accommodating space 123*f*. The accommodating space 123*f* communicates with the mixing chamber 150*f* via a through hole 107*f*. A cover (not shown in FIGS. 20 and 21) covers the upper surface of the base 120*f*, so as to seal the accommodating space 123*f* and the mixing chamber 150*f*.

Two storage chambers 110*f* are disposed in the accommodating space 123*f*. In the embodiment, each storage chamber 110*f* has a hollow structure. A top opening 114*f* is formed on the upper surface 112*f* of each storage chamber 110*f*, and a membrane 180*f* is disposed on the upper surface 112*f* relative to the top opening 114*f* of each storage chamber 110*f*. A bottom opening 116*f* is formed on the lower surface 111*f* of each storage chamber 110*f*, and a block structure 200*f* is disposed on the lower surface 111*f* relative to the bottom opening 116*f* of each storage chamber 110*f*. In the sixth embodiment, the block structures 200*f* are membranes, such as aluminum membranes. The block structures 200*f* may be connected to the lower surface of each storage chamber 110*f* by ultrasonic fusing, heat sealing, or laser radiation. The storage chambers 110 *f* may be used to hold the same or different fluid. For example, one of the storage chamber 110*f* holds the fluid F1, such as a reactive reagent, and the other storage chamber 110*f* holds the different fluid F1', such as a diluent. Alternatively, additional storage chambers 110*f* can be added so as to hold different fluids or reactive reagents. In some embodiments, the selection of the liquid in the mixing chamber 150*f* is determined according to the liquid held by the storage chamber 110*f*. For example, the mixing chamber 150*f* may hold reactive reagents. Alternatively, there is no liquid in the mixing chamber 150*f*.

The holder 160*f* includes a first lower surface 161*f* and a second lower surface 163*f*, the first lower surface 161*f* connects to the second lower surface 163*f* via the lateral surface 162*f*. A number of punctuating structures 165*f* are respectively formed on the first lower surface 161*f* of the holder 160*f* and extend along a direction toward the accommodating space 123*f* and terminate at their respective end portion. In some embodiments, the punctuating structures 165*f* and the holder 160*f* are formed integrally. In some embodiments, the end portion of each punctuating structure 165*f* has a sharp tip. In some embodiments, the extension length of each punctuating structure 165*f* is smaller than the height of the lateral surface 162*f* of the holder 160*f* It is appreciated that the number of the punctuating structures 165*f* should not be limited. The number of the punctuating structures 165*f* corresponds to that of the storage chamber 110*f*.

The sampling assembly 300*f* includes a seat 310*f* and a sampling member 330*f*. The seat 310*f* is disposed on the second lower surface 163*f* of the holder 160*f*. The sampling member 330*f* is disposed on the seat 310*f* and extends along a direction away from the second lower surface 163*f* of the holder 160*f*. A passage 370*f* is formed in the sampling member 330*f*. The passage 370*f* is used to collect the test sample F2 such as blood, urine, sputum, semen, feces, pus, tissue fluid, bone marrow, cell sample, or any other bodily fluid. A fluid inlet 371*f* and a fluid outlet 373*f* are formed at two end of the passage 370*f*, and fluid can flow through the passage 370*f* via the fluid inlet 371*f* and the fluid outlet 373*f*.

In the embodiment, a flow path 130*f* is defined in the testing module 1*f*. Specifically, an upstream 131*f* of the flow path 130*f* is formed in the storage chamber 110*f*, and a downstream 133*f* of the flow path 130*f* is formed in the mixing chamber 150*f*. The fluid F1 from the storage chamber 110*f* flows to the mixing chamber 150*f* via the flow path 130*f*.

Figure 21:
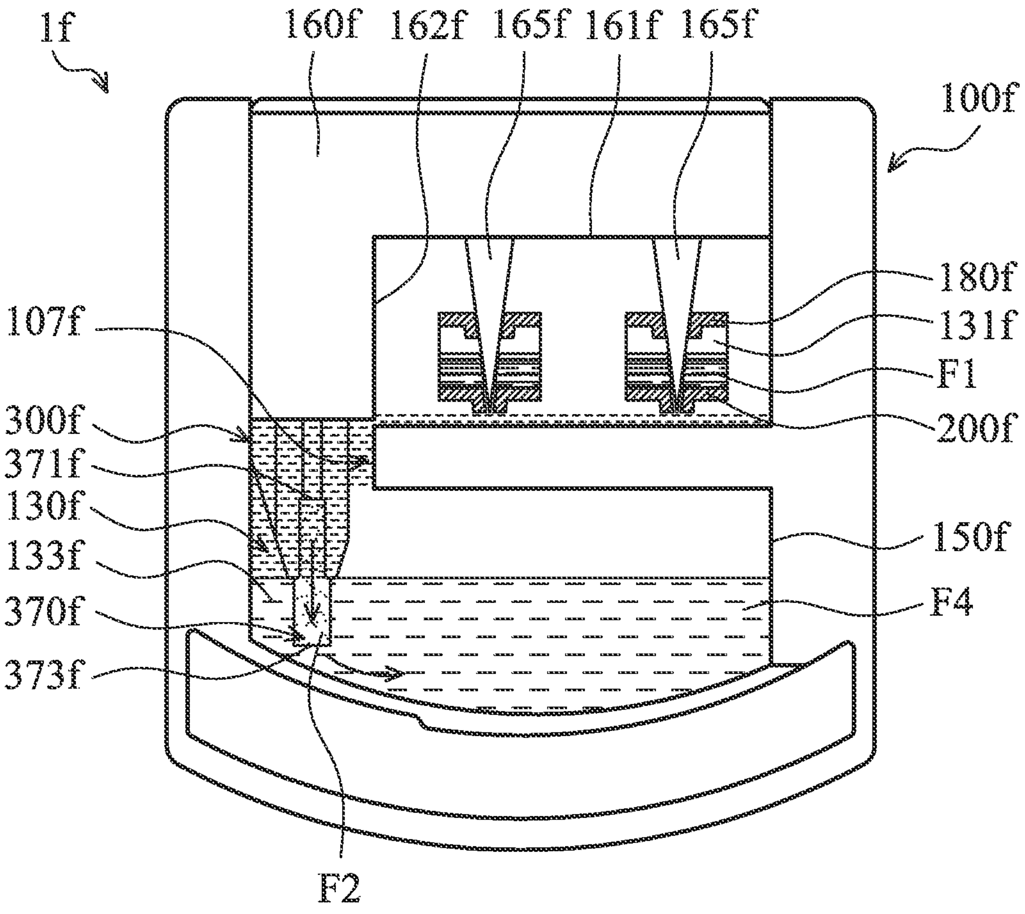
FIG. 21 shows a schematic view of a portion of the testing module of the sixth embodiment of the disclosure.

Referring to FIGS. 20-21, the operation method of testing the test sample F2 by the testing module if according to the sixth embodiment of the disclosure is described below.

In the beginning, as shown in FIG. 20, the fluid F1 and/or the fluid F1' is provided in the storage chambers 110*f* Before the connection of the sampling assembly 300*f* and the carrier 100*f*, the block structures 200*f* are in a first state, in which the storage chambers 110*f* are respectively sealed by the block structures 200*f* so that the fluid F1 and/or the fluid F1' is held in the storage chambers 110*e* safely. The first state of the block structure 200*e* refers to the membranes (the block structures 200*f*) are intact without breakage. Afterwards, the test sample F2 is collected in the passage 370*f* and kept in the passage 370*b* through capillary force.

Afterwards, the holder 160*f* and the sampling assembly 300*f* are transported along a direction indicated by the arrow shown in FIG. 20 and placed into the accommodating space 123*f* via the top lateral edge 1231*f* of the base 120*f*, wherein the sampling member 330*f* directly faces the through hole 107*f*, and the puncturing structures 105*f* directly face the block structures 165*f* respectively. It should be noted that during the connection of the holder 160*f* and the sampling assembly 300*f* to the carrier 100*f*, the puncturing structures 105*f* respectively penetrate the block structures 200*f* so that the block structures 200*f* transform to a second stage, in which each membrane (the block structure 2000 is piercingly penetrated. Afterwards, an opening is formed on the membranes 200*f*.

At this moment, as shown in FIG. 21, the fluid F1 and/or the fluid F1' flow out of the storage chambers 110*f* via the upstream 131*f* Afterwards, the fluid F and/or the fluid F1' are driven to flow into the mixing chamber 150*f* via the downstream 133*f*. Before the fluid F1 and/or the fluid F1' flow into the mixing chamber 150*f*, a portion of the fluid F1 and/or the fluid F1' flow into the mixing chamber 150*f* via the through hole 107*f*, and the other portion of the fluid F1 and/or the fluid F1' flow into the mixing chamber 150*f* via the passage 370*f* after mixing with the test sample F2 in the passage 370*f*. Specifically, the fluid F1 and/or the fluid F1' enter the passage 370*f* via the fluid inlet 371*f* of the passage 370*f* and leaves the passage 370*f* via the fluid outlet 373*f* of the passage 370*e* together with the test sample F2. In the embodiment, the viscosity of the fluid F1 and/or the fluid F1' are lower than that of the test sample F2 so as to facilitate the fluid F1 and/or the fluid F1' flushing the test sample F2 out of the passage 370*f*. In another embodiment, the viscosity of the fluid F1 and/or the fluid F1' are higher than or equal to that of the test sample F2, the fluid F1 and/or the fluid F1' will enter the passage 370*f* and bring the test sample F2 to the mixing chamber 150*f*. Once the fluid F1 and/or the fluid F1' and the test sample F2 enters the mixing chamber 150*f* and are uniformly mixed to form a mixture F4, the reaction between the fluid F1 and/or the fluid F1' and the test sample F2 begins. Alternatively, a reaction of the fluid F1 and the fluid F1' may begin in the passage 370*f*. Last, after the reaction of the fluid F1 and/or the fluid F1' and the test sample F2 is finished, a measurement of the reaction result is performed. Therefore, the process of testing the test sample F2 is completed.

In the sixth embodiment, the operation of driving the fluid F1 and/or the fluid F1' to flow into the mixing chamber 150*f* includes placing the testing module if as a whole on a rotation plate, wherein the storage chamber 110*f* is closer to a rotation center of the rotation plate than the mixing chamber 150*f*. Afterwards, the rotation plate is rotated about a rotation axis rotate the rotation plate so as to generate a centrifugal force to the fluid F1 and/or the fluid F1' are driven to flow. In another embodiment, the operation of driving the fluid F1 and/or the fluid F1' to flow out of the storage chamber 110*f* includes providing a pump to drive the fluid F1 and/or the fluid F1' to flow.

In the sixth embodiment, while there are two punctuating structures 105*f* are arranged, the number of the punctuating structure 105*f* may be modified according to the number of the storage chamber 110*f* wherein each punctuating structure 105*f* faces one of the storage chambers 110*f*, to enable the fluid or the reactive reagent in the storage chamber to be released, and the fluid or the reactive reagent flows into the mixing chamber 150*f* via the through hole 170*f* or the passage 370*f*.

With the design that the fluid flushes the test sample into the mixing chamber, the testing module of the disclosure achieves the functions of liquid transporting, liquid dilution, and liquid mixing. In addition, since the process operations are reduced, the testing efficiency is improved.

While the invention has been described by way of example and in terms of preferred embodiment, it is to be understood that the invention is not limited thereto. On the contrary, it is intended to cover various modifications and similar arrangements (as would be apparent to those skilled in the art). Therefore, the scope of the appended claims should be accorded the broadest interpretation so as to encompass all such modifications and similar arrangements.

What is claimed is:

1. A testing module, adapted to test a test sample, the testing module comprising:

a flow path, configured to guide the flow of a fluid;

a storage chamber, fluidly connected to an upstream of the flow path and configured to provide the fluid;

a carrier, having a mixing chamber, wherein the mixing chamber is fluidly connected to a downstream of the flow path and configured to receive the fluid and the test sample;

a block member, disposed in the flow path and selectively transformed from a first state to a second state; and a sampling assembly, detachably connected to the carrier and comprising a sampling member configured to collect the test sample;

wherein a passage is formed in the sampling member, and the test sample is disposed inside the passage, wherein the passage comprises a fluid inlet configured to receive the fluid in the storage chamber and a fluid outlet configured to exhaust the fluid and the test sample to the downstream of the flow path;

wherein before the sampling assembly is connected to the carrier, the block member is in the first state to block the fluid in the storage chamber flowing from the upstream of the flow path to the downstream of the flow path;

wherein after the sampling assembly is connected to the carrier, the block member is in the second state to enable the fluid in the storage chamber to flow from the upstream of the flow path to the downstream of the flow path, and the sampling member is placed in the flow path;

wherein after the fluid flows out of the storage chamber, a portion of the fluid flows into the downstream of the flow path via the passage of the sampling member and mixes with the test sample in the sampling member and then flows into the mixing chamber, and the other portion of the fluid flows into the downstream of the flow path via the periphery of the sampling member, not via the passage of the sampling member, and then flows into the mixing chamber.

2. The testing module as claimed in claim 1, further comprising a puncturing structure arranged relative to the block structure;

wherein the block structure comprises a membrane, and a bottom opening is formed on a lower surface of the storage chamber, and the membrane is connected to the storage chamber relative to the bottom opening, wherein the first state refers to the membrane being intact without breakage, and the second state refers to an opening being formed on the membrane after the sampling assembly is connected to the carrier;

wherein the puncturing structure is configured to penetrate the membrane.

3. The testing module as claimed in claim 2, wherein the puncturing structure comprises a piercing part and a depressed portion depressed from a lateral surface of the puncturing structure for allowing the fluid from the storage chamber passing therethrough.

4. The testing module as claimed in claim 3, wherein the puncturing structure comprises a bottom portion and a top portion disposed on the bottom portion and having the piercing part, wherein the lateral surface relative to the top portion has an inclined surface, and the width of the top portion is varied.

5. The testing module as claimed in claim 3, further comprising a supporting member disposed adjacent to the puncturing structure, wherein the storage chamber abuts against the supporting member after the sampling assembly is connected to the carrier.

6. The testing module as claimed in claim 2, wherein the storage chamber comprises a plurality of storage spaces secluded from each other, and wherein the number of the storage spaces corresponds to that of the puncturing structures, and each puncturing structure faces one of the storage spaces.

7. The testing module as claimed in claim 2, wherein a top opening is formed on an upper surface of the storage chamber, and another membrane is formed on the upper surface of the storage chamber relative to the top opening, the puncturing structure penetrates both of the membranes after the sampling assembly is connected to the carrier.

8. The testing module as claimed in claim 7, wherein the puncturing structure and the sampling assembly are formed integrally and connected to the carrier in a detachable manner.

9. The testing module as claimed in claim 7, wherein at least one dent is formed on a circumferential surface of the sampling member and communicates with the passage, and the fluid inlet is formed relative to the at least one dent, and the fluid outlet is formed on a bottom surface of the sampling member, wherein the bottom surface of the sampling member communicates the mixing chamber.

10. The testing module as claimed in claim 9, wherein the number of the at least one dent is two, and the passage comprises another fluid inlet configured to receive the fluid in the storage chamber, wherein the two dents are formed on two opposite sides of the circumferential surface of the sampling member, the two fluid inlets are respectively formed relative to the two dents.

11. The testing module as claimed in claim 1, wherein the block structure comprises a recess formed on an upper surface of the carrier, and when the sampling assembly is connected to the carrier, the sampling member is disposed in the recess, wherein a width of the sampling member is smaller than that of the recess.

12. The testing module as claimed in claim 1, wherein the block structure comprises an opening penetrating the carrier, and a notch is formed in the vicinity of the block structure, wherein the sampling assembly further comprises a clamping structure, after the sampling assembly is connected to the carrier, the clamping structure engages with the notch, and the sampling assembly is disposed in the opening.

13. The testing module as claimed in claim 12, further comprises a liquid-absorbing material disposed on a lower surface of the carrier relative to the opening.

14. The testing module as claimed in claim 1, wherein the sampling assembly comprises a supporting structure, wherein the sampling member is disposed on the supporting structure;

wherein the block structure comprises:

a recess, formed on an upper surface of the carrier and including a bottom surface; and an opening, formed on a lower surface of the carrier and communicating with the recess;

wherein the sampling assembly is connected to the carrier through the opening, and the supporting structure abuts the bottom surface of the recess when the sampling member is placed in the flow path.

15. The testing module as claimed in claim 14, wherein the bottom surface of the recess is an inclined surface, wherein a region of the bottom surface of the recess which is adjacent to the upstream of the flow path is higher than another region of the bottom surface of the recess which is adjacent to the downstream of the flow path.

16. The testing module as claimed in claim 2, wherein the carrier further comprising an accommodating space communicating with the mixing chamber;

wherein the sampling assembly constitutes a single assembly with one of the punctuating structure and the storage chamber, and the other one of the punctuating structure and the storage chamber is disposed in the accommodating space.

17. The testing module as claimed in claim 4, wherein the puncturing structure comprises a bottom portion and a top portion positioned on the bottom portion, wherein the width of the top portion is increased from a width to a width along a direction toward the bottom portion, and the depressed portion has a depth of which is smaller than or equal to the width.

18. The testing module as claimed in claim 16, wherein the sampling assembly is arranged adjacent to the bottom opening and disposed on the lower surface of the storage chamber, and the punctuating structure is disposed in the accommodating space, wherein when the sampling assembly is inserted into the carrier, the storage chamber is placed in the accommodating space, and the membrane is penetrated by the punctuating structure.

19. The testing module as claimed in claim 16, further comprising a holder, wherein the punctuating structure and the sampling assembly are respectively formed on a lower surface of the holder, and the storage chamber is disposed in the accommodating space, wherein when the sampling assembly is inserted into carrier, the punctuating structure is placed in the accommodating space and penetrates the membrane.

20. The testing module as claimed in claim 16, wherein the carrier further comprises a through hole fluidly connecting the mixing chamber and the accommodating space, wherein the storage chamber is placed in the accommodating space and the sampling assembly is disposed in the through hole when the sampling assembly is connected to the carrier.

* * * * *